(12) United States Patent
Nam et al.

(10) Patent No.: US 11,828,831 B2
(45) Date of Patent: Nov. 28, 2023

(54) BISTATIC SENSING-TRACKING REFERENCE SIGNAL

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Sony Akkarakaran, Poway, CA (US); Junyi Li, Franklin Park, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 361 days.

(21) Appl. No.: 17/160,851

(22) Filed: Jan. 28, 2021

(65) Prior Publication Data

US 2022/0236394 A1 Jul. 28, 2022

(51) Int. Cl.
*G01S 13/00* (2006.01)
*G01S 7/00* (2006.01)
*G01S 13/72* (2006.01)

(52) U.S. Cl.
CPC ............ *G01S 13/003* (2013.01); *G01S 7/006* (2013.01); *G01S 13/723* (2013.01)

(58) Field of Classification Search
None
See application file for complete search history.

(56) References Cited

U.S. PATENT DOCUMENTS

2020/0371220 A1 11/2020 Eitan et al.

FOREIGN PATENT DOCUMENTS

| WO | 2020216522 A1 | 10/2020 |
| WO | 2021004378 A1 | 1/2021 |

OTHER PUBLICATIONS

Du (Huawei) R., et al., "Definitions and Scenarios of the WLAN Sensing—Follow Ups", IEEE Draft, IEEE 802.11-21/0147r0, 11-21-0147-00-00BF-DEFINITIONS-AND-SCENARIOS-OF-THE-WLAN-SENSING-FOLLOW-UPS, IEEE-SA Mentor, Piscataway, NJ, USA, vol. 802.11bf, Jan. 25, 2021 (Jan. 25, 2021), pp. 1-19, Jan. 26, 2021, XP068175981, Retrieved from the Internet: URL: https://mentor.ieee.org/802.11/dcn/21/11-21-0147-00-00bf-definitions-and-scenarios-of-the-wlan-sensing-follow-ups.pptx [retrieved on Jan. 25, 202] Slides 4 to 13.
International Search Report and Written Opinion—PCT/US2021/072608—ISA/EPO —Mar. 16, 2022.

*Primary Examiner* — Whitney Moore
(74) *Attorney, Agent, or Firm* — Muncy, Geissler, Olds & Lowe, P.C.

(57) ABSTRACT

In an aspect, a first and second wireless node communicate a bistatic sensing request and a response to the bistatic sensing request to coordinate setup of a bistatic sensing procedure. The first wireless node transmits a set of sensing signals to one or more target objects in accordance with the bistatic sensing procedure. The second wireless node measures a set of reflections of the set of sensing signals reflected off of one or more target objects in accordance with the bistatic sensing procedure.

62 Claims, 20 Drawing Sheets

BISTATIC SENSING-TRACKING REFERENCE SIGNAL

BACKGROUND OF THE DISCLOSURE

1. Field of the Disclosure

Aspects of the disclosure relate generally to wireless communications, and more particularly to bistatic sensing and/or tracking.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipments (UEs), vehicles, factory automation machinery, and the like. However, mmW RF signals can be used for other purposes as well.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a first wireless node includes: communicating, between the first wireless node and a second wireless node, a bistatic sensing request and a response to the bistatic sensing request to coordinate setup of a bistatic sensing procedure; and transmitting a set of sensing signals to one or more target objects in accordance with the bistatic sensing procedure.

In some aspects, the bistatic sensing request is transmitted by the first wireless node to the second wireless node and the response to the bistatic sensing request is received at the first wireless node from the second wireless node.

In some aspects, the bistatic sensing request is beam swept by the first wireless node across a plurality of transmission beams.

In some aspects, the method includes transmitting, to a third wireless node, another bistatic sensing request to coordinate setup of another bistatic sensing procedure In some aspects, the bistatic sensing request is received at the first wireless node from the second wireless node and the response to the bistatic sensing request is transmitted by the first wireless node to the second wireless node.

In some aspects, the first wireless node corresponds to a user equipment (UE) and the second wireless node corresponds to a base station, or the second wireless node corresponds to a UE and the first wireless node corresponds to a base station, or wherein the first and second wireless nodes correspond to base stations, or wherein the first and second wireless nodes correspond to UEs.

In some aspects, the method includes communicating, with the second wireless node, a reference signal for timing calibration.

In some aspects, the bistatic sensing request and the reference signal for timing calibration are both received at the first wireless node from the second wireless node, or the bistatic sensing request and the reference signal for timing calibration are both transmitted by the first wireless node to the second wireless node.

In some aspects, the bistatic sensing request, the response to the bistatic sensing request, or both, are communicated over a wireless communications link or a wired communications link.

In some aspects, the wireless or wired communications link is pre-configured before the bistatic sensing procedure is triggered or is setup in association with the bistatic sensing procedure.

In some aspects, the bistatic sensing request, the response to the bistatic sensing request, or both, are communicated over the wireless communications link, and the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

In some aspects, the response to the bistatic sensing request comprises an indication of a location of the respective wireless node that transmits the response to the bistatic sensing request, an indication of acceptance or rejection of the bistatic sensing request, or a combination thereof.

In some aspects, the method includes communicating, with the second wireless node, a reference signal.

In some aspects, the response to the bistatic sensing request and the reference signal for timing calibration are both received at the first wireless node from the second wireless node, or the response to the bistatic sensing request and the reference signal for timing calibration are both transmitted by the first wireless node to the second wireless node.

In some aspects, the reference signal corresponds to a reference signal for timing calibration, or the reference signal corresponds to a reference signal for positioning.

In some aspects, a timing of the reference signal is pre-configured or indicated by the bistatic sensing request.

In some aspects, the method includes receiving, from the second wireless node, a measurement report that comprises one or more measurements by the second wireless node of a set of reflections of the set of sensing signals off of the one or more target objects.

In some aspects, the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

In some aspects, the bistatic sensing procedure is triggered periodically, semi-persistently, or aperiodically.

In some aspects, the bistatic sensing procedure is triggered periodically or semi-persistently, and the bistatic sensing procedure corresponds to one of a plurality of bistatic sensing procedures for which setup is coordinated by the communication of the bistatic sensing request and the response to the bistatic sensing request.

In some aspects, reference signals for timing, positioning, or both, are communicated between the first and second wireless nodes for each of the plurality of bistatic sensing procedures, and the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

In an aspect, a method of operating a second wireless node includes: communicating, between the second wireless node and a first wireless node, a bistatic sensing request and a response to the bistatic sensing request to coordinate setup of a bistatic sensing procedure; and measuring a set of reflections of a set of sensing signals transmitted by the first wireless node and reflected off of one or more target objects in accordance with the bistatic sensing procedure.

In some aspects, the bistatic sensing request is transmitted by the second wireless node to the first wireless node and the response to the bistatic sensing request is received at the second wireless node from the first wireless node.

In some aspects, the bistatic sensing request is beam swept by the second wireless node across a plurality of transmission beams.

In some aspects, the method includes transmitting, to a third wireless node, another bistatic sensing request to coordinate setup of another bistatic sensing procedure In some aspects, the bistatic sensing request is received at the second wireless node from the first wireless node and the response to the bistatic sensing request is transmitted by the second wireless node to the first wireless node.

In some aspects, the first wireless node corresponds to a user equipment (UE) and the second wireless node corresponds to a base station, or the second wireless node corresponds to a UE and the first wireless node corresponds to a base station, or wherein the first and second wireless nodes correspond to base stations, or wherein the first and second wireless nodes correspond to UEs.

In some aspects, the method includes communicating, with the first wireless node, a reference signal for timing calibration.

In some aspects, the bistatic sensing request and the reference signal for timing calibration are both received at the second wireless node from the first wireless node, or the bistatic sensing request and the reference signal for timing calibration are both transmitted by the second wireless node to the first wireless node.

In some aspects, the bistatic sensing request, the response to the bistatic sensing request, or both, are communicated over a wireless communications link or a wired communications link.

In some aspects, the wireless or wired communications link is pre-configured before the bistatic sensing procedure is triggered or is setup in association with the bistatic sensing procedure.

In some aspects, the bistatic sensing request, the response to the bistatic sensing request, or both, are communicated over the wireless communications link, and the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

In some aspects, the response to the bistatic sensing request comprises an indication of a location of the respective wireless node that transmits the response to the bistatic sensing request, an indication of acceptance or rejection of the bistatic sensing request, or a combination thereof.

In some aspects, the method includes communicating, with the first wireless node, a reference signal.

In some aspects, the response to the bistatic sensing request and the reference signal for timing calibration are both received at the second wireless node from the first wireless node, or the response to the bistatic sensing request and the reference signal for timing calibration are both transmitted by the second wireless node to the first wireless node.

In some aspects, the reference signal corresponds to a reference signal for timing calibration, or the reference signal corresponds to a reference signal for positioning.

In some aspects, a timing of the reference signal is pre-configured or indicated by the bistatic sensing request.

In some aspects, the method includes transmitting, to a device, a measurement report that comprises one or more measurements based on the measuring.

In some aspects, the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

In some aspects, the bistatic sensing procedure is triggered periodically, semi-persistently, or aperiodically.

In some aspects, the bistatic sensing procedure is triggered periodically or semi-persistently, and the bistatic sensing procedure corresponds to one of a plurality of bistatic sensing procedures for which setup is coordinated by the communication of the bistatic sensing request and the response to the bistatic sensing request.

In some aspects, reference signals for timing, positioning, or both, are communicated between the first and second wireless nodes for each of the plurality of bistatic sensing procedures, and the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

In an aspect, a first wireless node includes: a memory; at least one transceiver; and at least one processor communicatively coupled to the memory and the at least one transceiver, the at least one processor configured to: communicate, between the first wireless node and a second wireless node, a bistatic sensing request and a response to the bistatic sensing request to coordinate setup of a bistatic sensing procedure; and transmit a set of sensing signals to one or more target objects in accordance with the bistatic sensing procedure.

In an aspect, a second wireless node includes: a memory; at least one transceiver; and at least one processor communicatively coupled to the memory and the at least one transceiver, the at least one processor configured to: communicate, between the second wireless node and a first wireless node, a bistatic sensing request and a response to the bistatic sensing request to coordinate setup of a bistatic sensing procedure; and measure a set of reflections of a set of sensing signals transmitted by the first wireless node and reflected off of one or more target objects in accordance with the bistatic sensing procedure.

In an aspect, a first wireless node includes: means for communicating, between the first wireless node and a second wireless node, a bistatic sensing request and a response to the bistatic sensing request to coordinate setup of a bistatic sensing procedure; and means for transmitting a set of sensing signals to one or more target objects in accordance with the bistatic sensing procedure.

In an aspect, a second wireless node includes: means for communicating, between the second wireless node and a first wireless node, a bistatic sensing request and a response to the bistatic sensing request to coordinate setup of a bistatic sensing procedure; and means for measuring a set of reflections of a set of sensing signals transmitted by the first wireless node and reflected off of one or more target objects in accordance with the bistatic sensing procedure.

In an aspect, a non-transitory computer-readable medium storing a set of instructions includes one or more instructions that, when executed by one or more processors of a first wireless node, cause the first wireless node to: communicate, between the first wireless node and a second wireless node, a bistatic sensing request and a response to the bistatic sensing request to coordinate setup of a bistatic sensing procedure; and transmit a set of sensing signals to one or more target objects in accordance with the bistatic sensing procedure.

In an aspect, a non-transitory computer-readable medium storing a set of instructions includes one or more instructions that, when executed by one or more processors of a second wireless node, cause the second wireless node to: communicate, between the second wireless node and a first wireless node, a bistatic sensing request and a response to the bistatic sensing request to coordinate setup of a bistatic sensing procedure; and measure a set of reflections of a set of sensing signals transmitted by the first wireless node and reflected off of one or more target objects in accordance with the bistatic sensing procedure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitations thereof.

DETAILED DESCRIPTION

Figure 1:
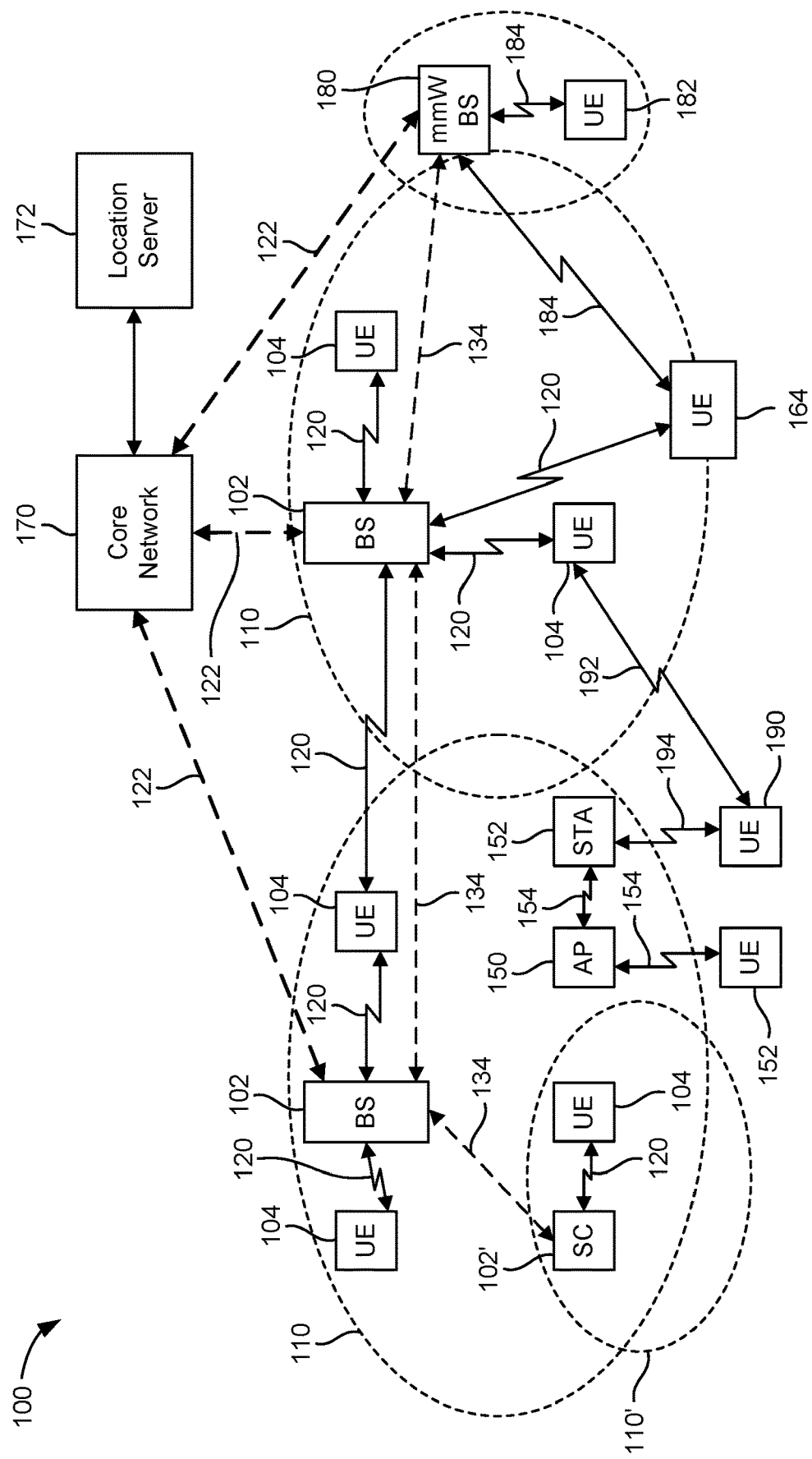
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual-connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported by any well-known D2D RAT, such as LTE Direct (LTE-D), WiFi Direct (WiFi-D), Bluetooth®, and so on.

Figure 2A:
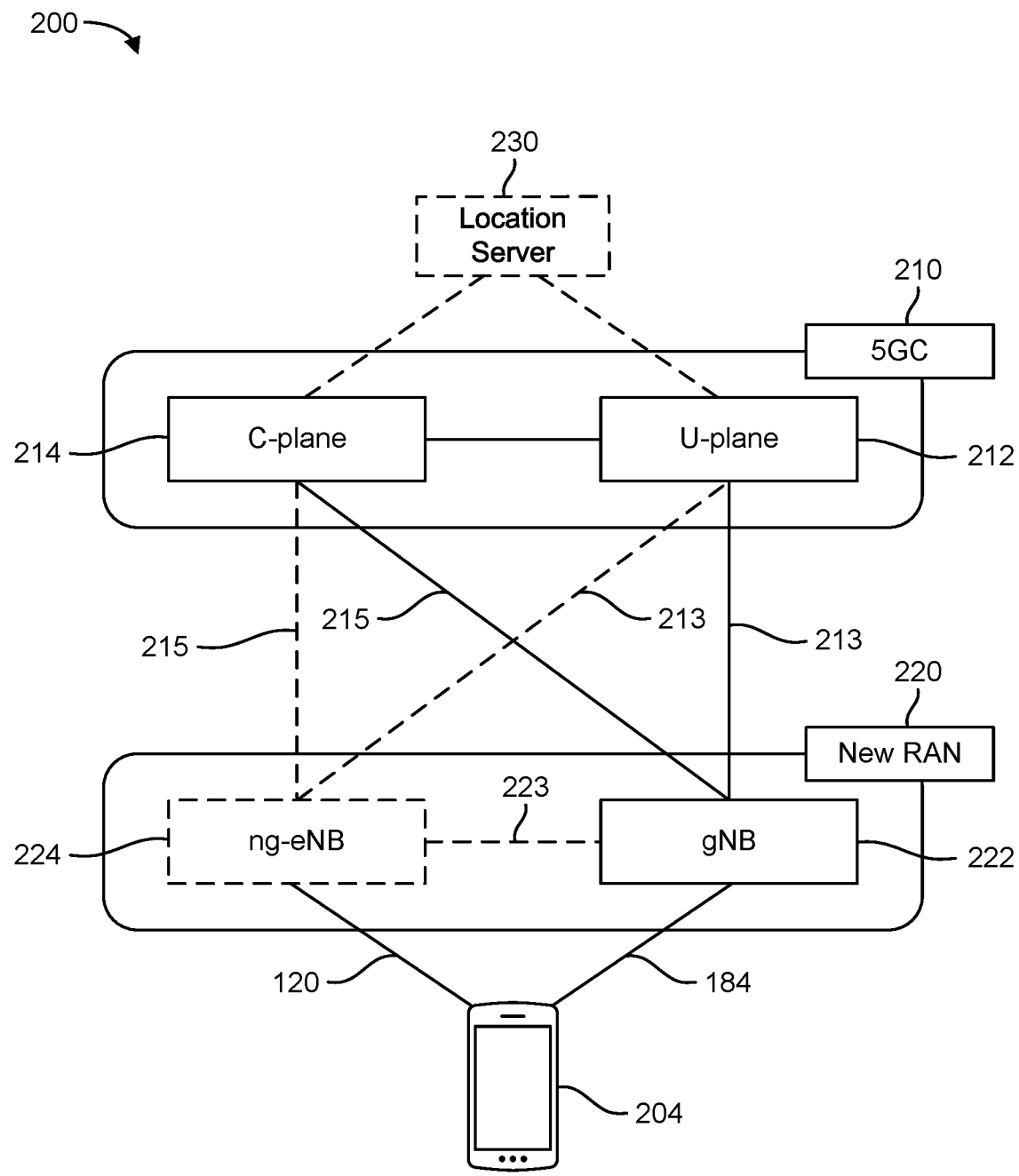
FIGS. 2A and 2B illustrate example wireless network structures, according to various aspects of the disclosure.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
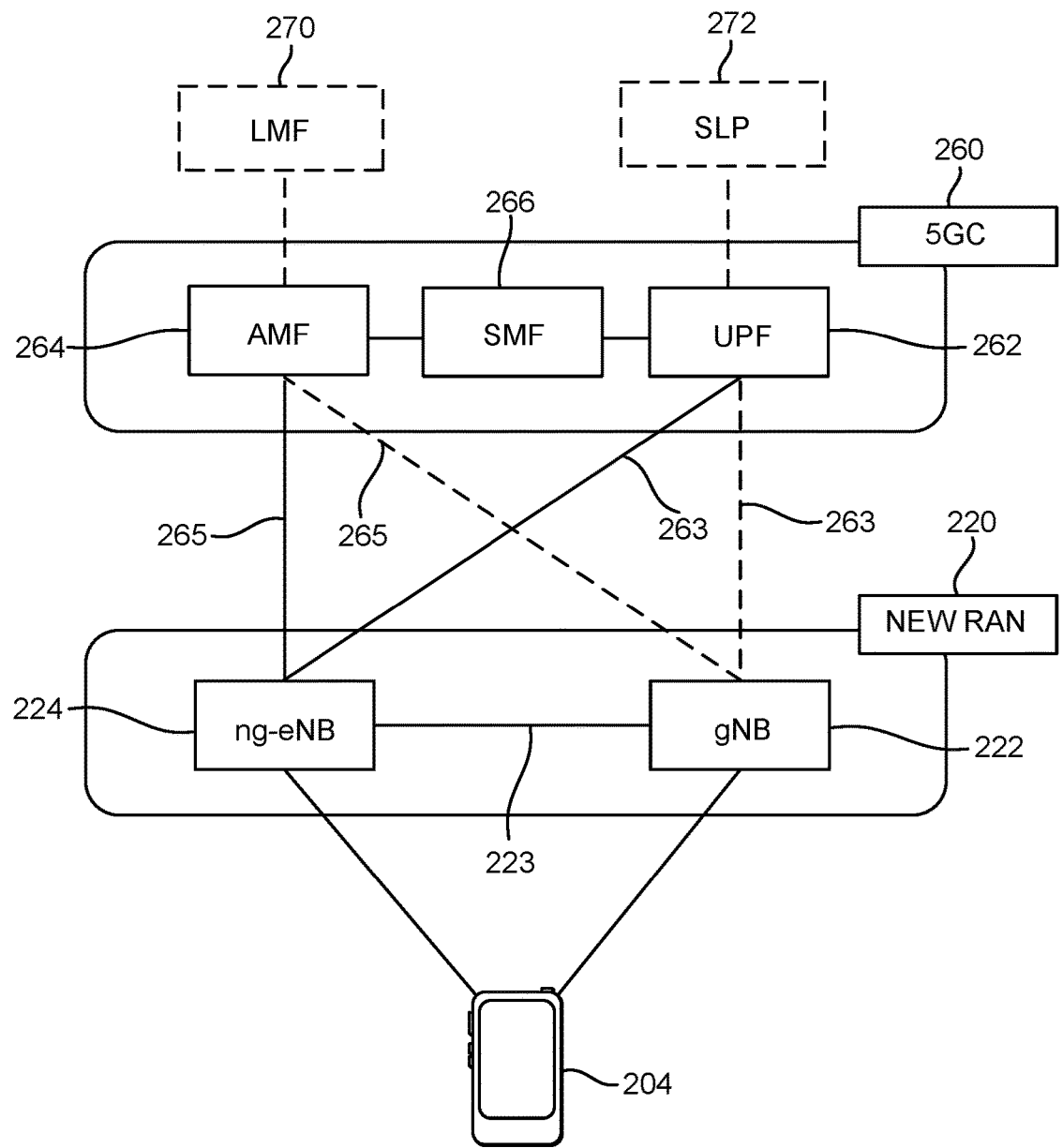

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
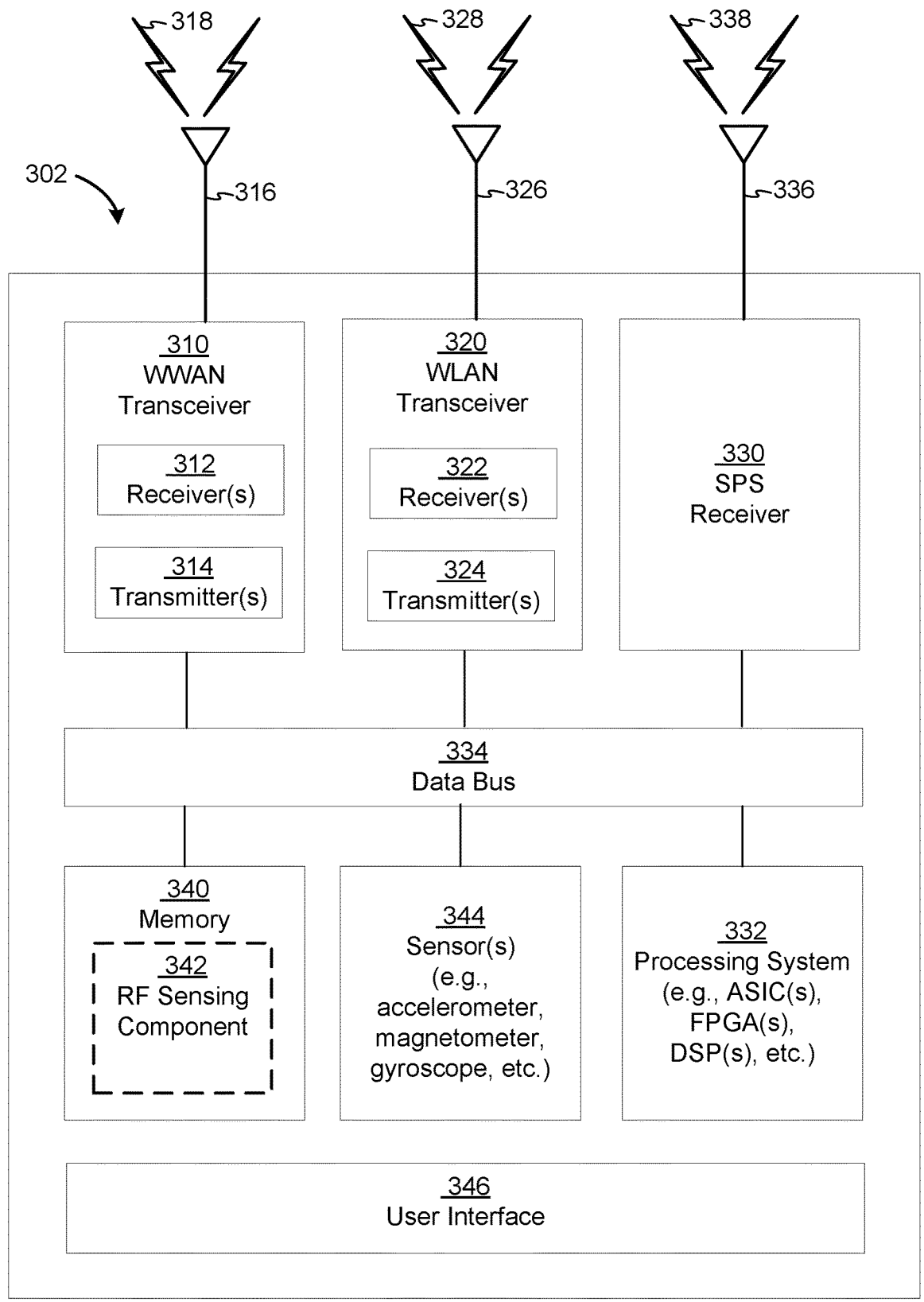
FIGS. 3A to 3C are simplified block diagrams of several sample aspects of components that may be employed in wireless communication nodes and configured to support communication as taught herein.
Figure 3B:
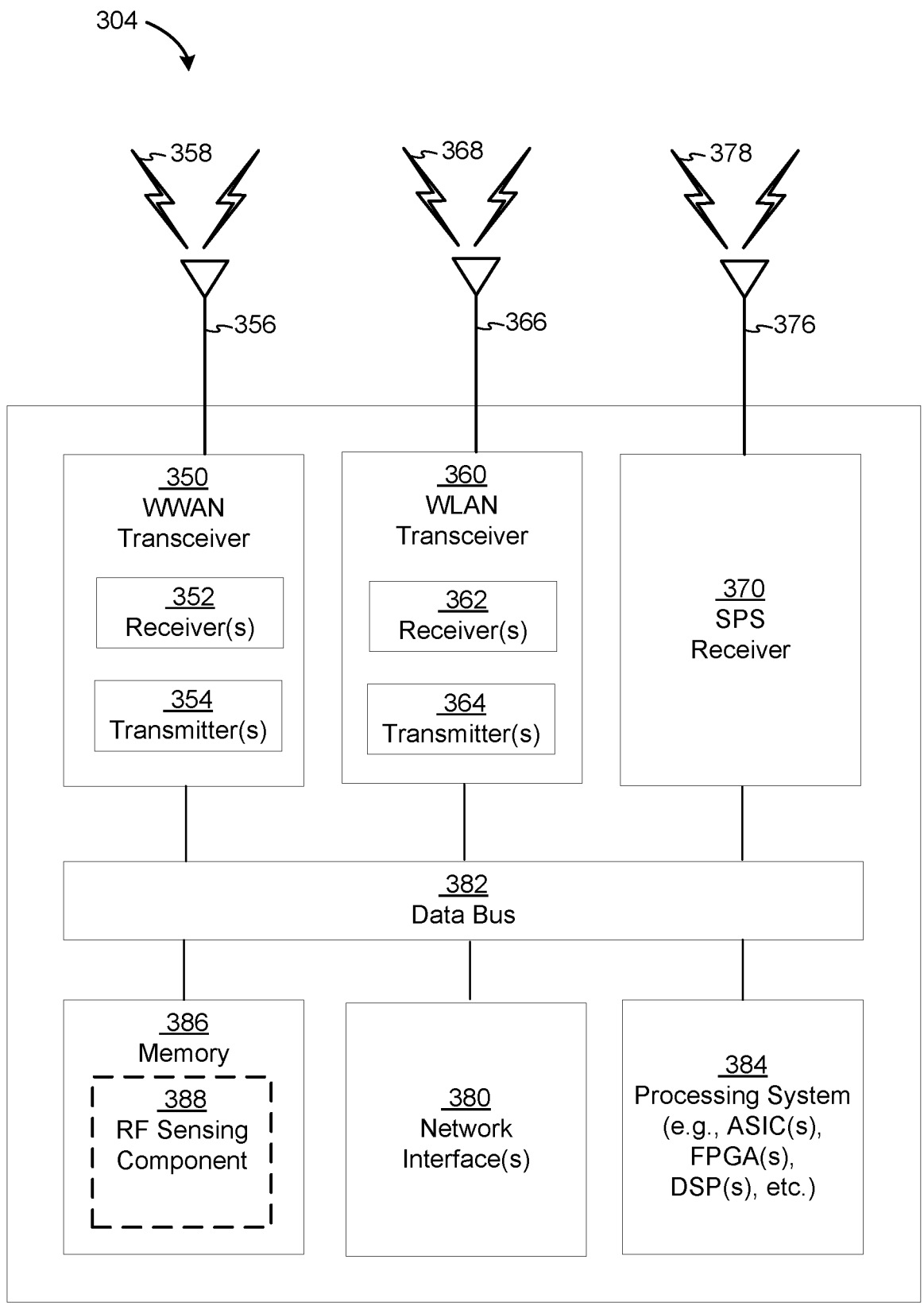
Figure 3C:
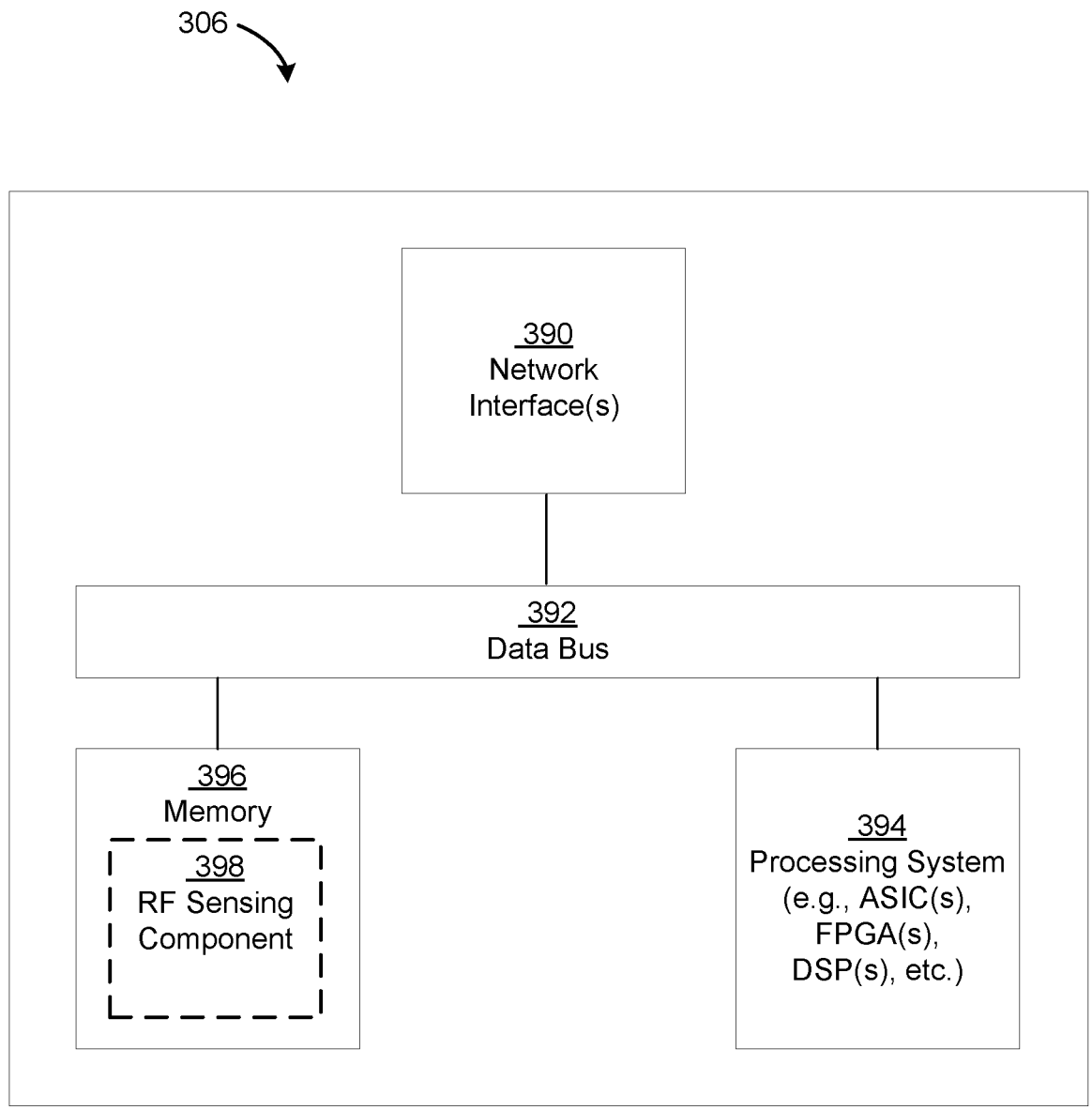

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, RF sensing, and for providing other processing functionality. The base station 304 includes a processing system 384 for providing functionality relating to, for example, RF sensing as disclosed herein, and for providing other processing functionality. The network entity 306 includes a processing system 394 for providing functionality relating to, for example, RF sensing as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
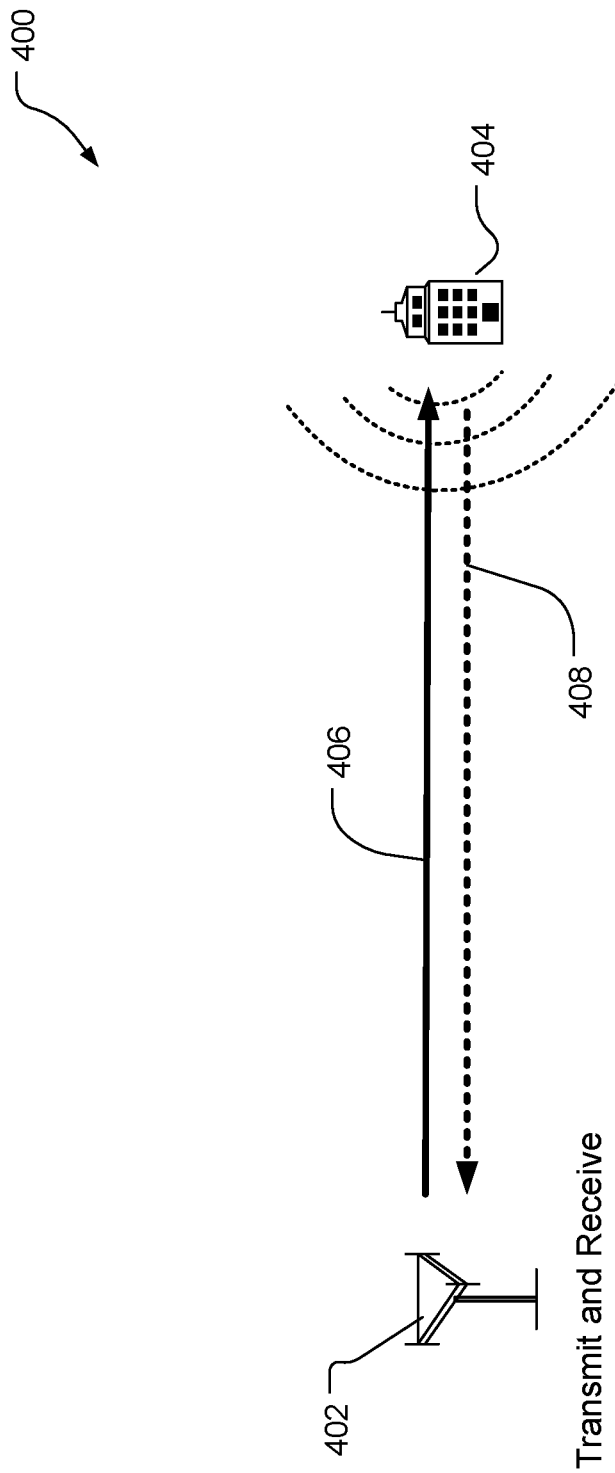
FIG. 4A illustrates an example monostatic radar system.
Figure 4B:
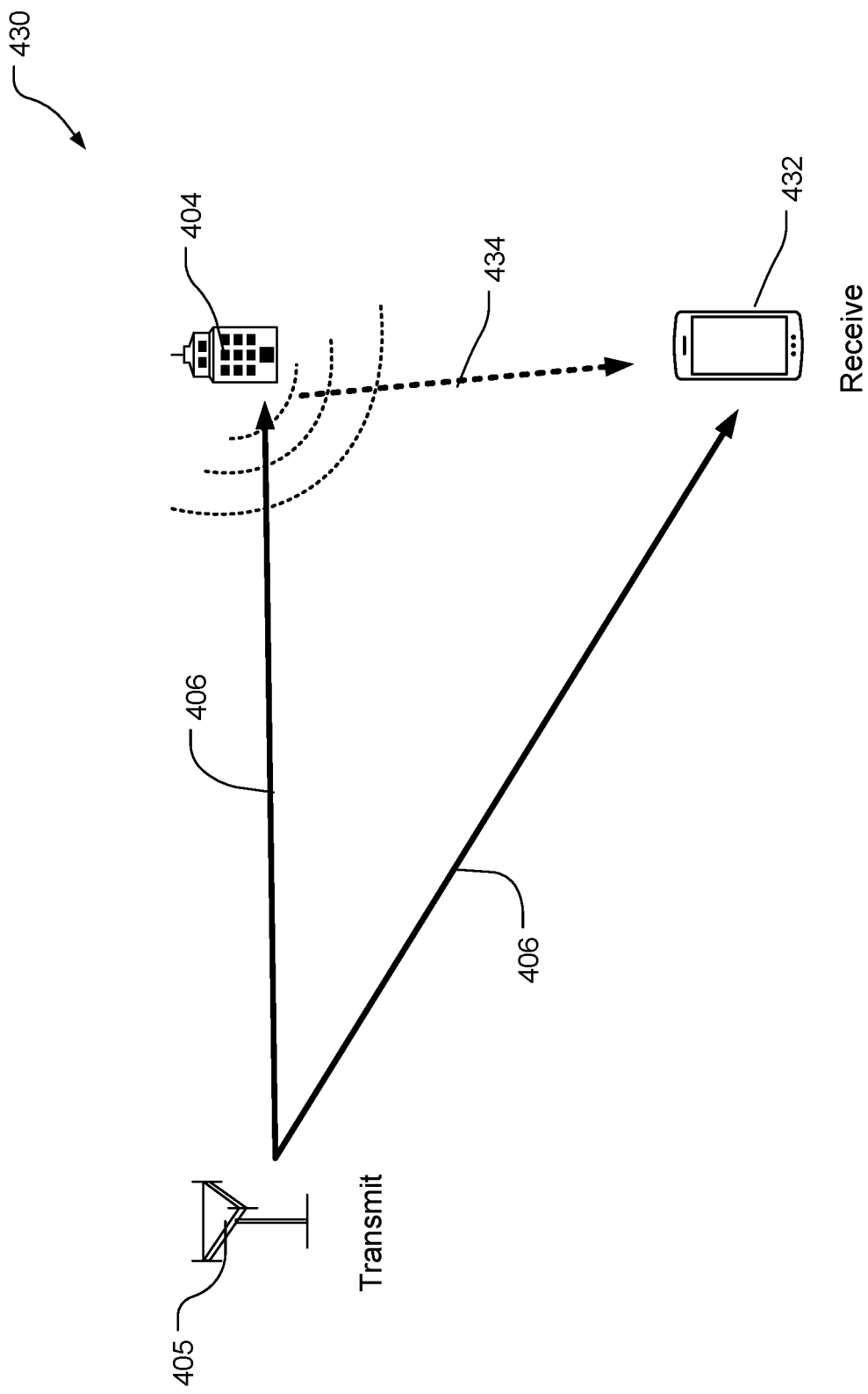
FIG. 4B illustrates an example bistatic radar system.

In general, there are different types of radar, and in particular, monostatic and bistatic radars. FIGS. 4A and 4B illustrate two of these various types of radar. Specifically, FIG. 4A is a diagram 400 illustrating a monostatic radar scenario, and FIG. 4B is a diagram 430 illustrating a bistatic radar scenario. In FIG. 4A, a base station 402 may be configured for full duplex operation and thus the transmitter (Tx) and receiver (Rx) are co-located. For example, a transmitted radio signal 406 may be reflected off of a target object, such as a building 404, and the receiver on the base station 402 is configured to receive and measure a reflected beam 408. This is a typical use case for traditional, or conventional, radar. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal 406 which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 404 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive beamforming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
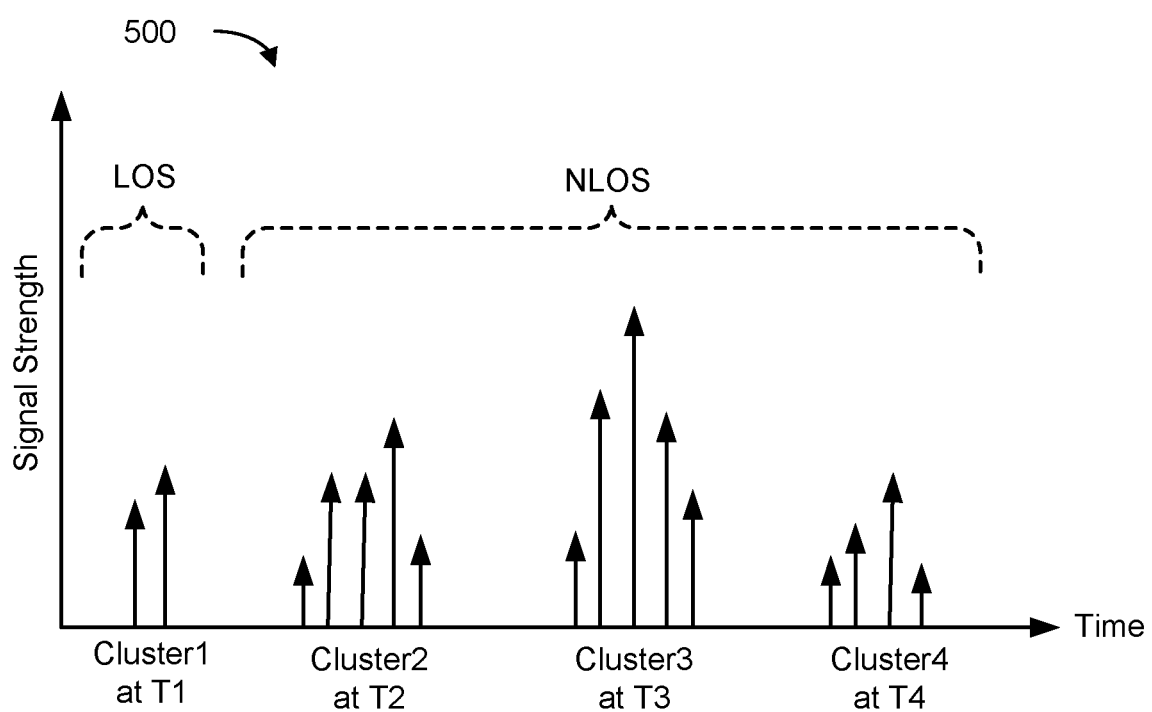
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
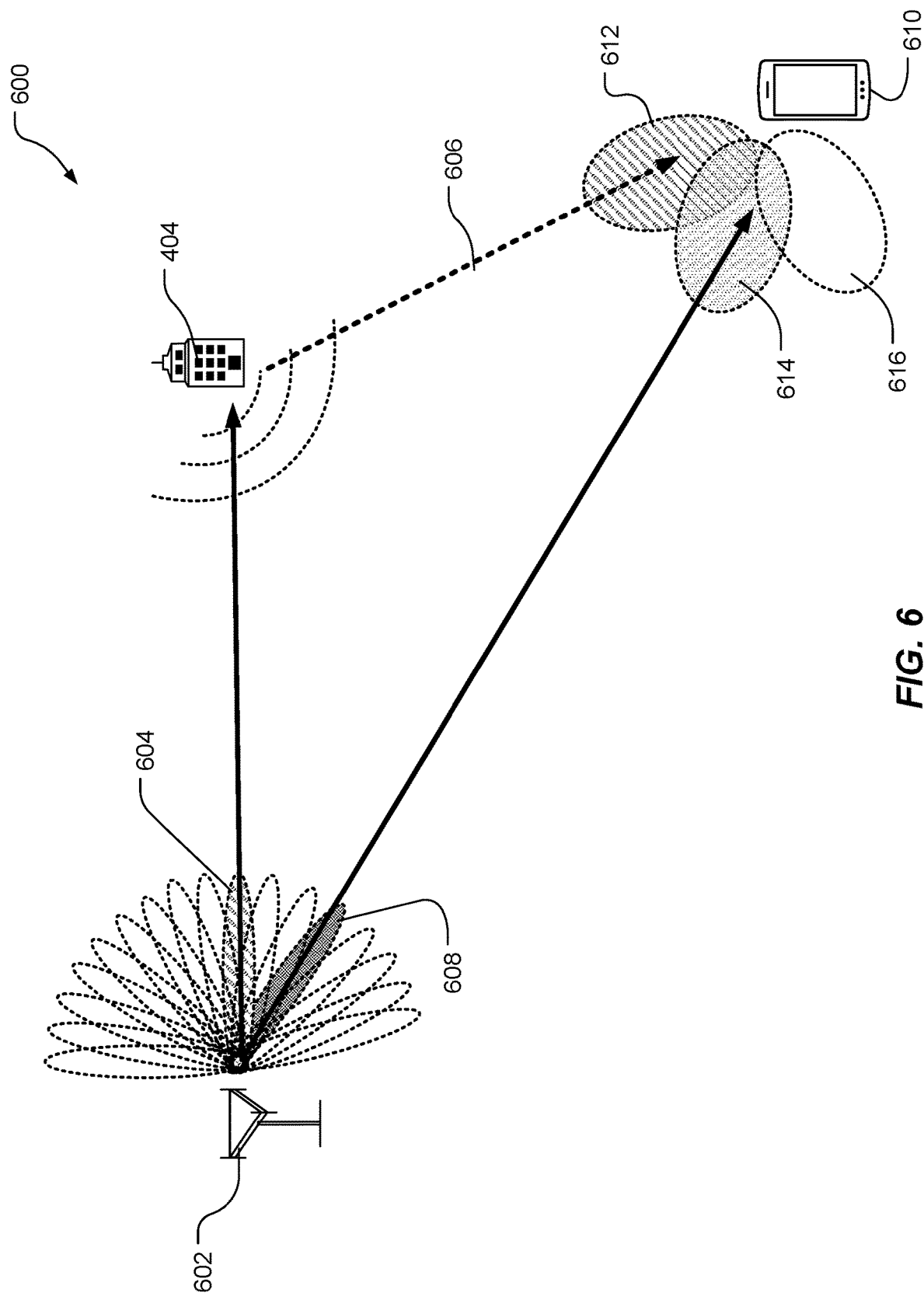
FIG. 6 illustrates an example single target beam management use case for bistatic radio frequency sensing.

Referring to FIG. 6, an example single target beam management use case 600 for bistatic radio frequency sensing is shown. The use case 600 includes a base station 602, such as a 5G NR gNB configured to transmit a plurality of beamformed signals along different azimuths and/or elevations, and a UE 610 configured to utilize receive beamforming to improve the gain of signals based on the angle of arrival. The base station 602 may be configured to generate N different reference beams and various azimuths, elevations, and/or beam widths. In an example the beams transmitted by the base station 602 may be based on SS Blocks, CSI-RS, TRS, or PRS resource sets. Other sensing and tracking reference signals may also be used. The UE 610 may be configured to utilize phase shifters and other software and hardware techniques to generate receive beams such as a first receive beam 612, a second receive beam 614, and a third receive beam 616. The UE 610 may also be configured to utilize beam forming for transmitted beams. The base station 602 may transmit a first reference signal 604 in the direction of a target object, such as the building 404, which may be reflected and the UE 610 may receive a reflected signal 606 with the first receive beam 612. The reflected signal 606 represents a NLOS path of the first reference signal 604 to the UE 610. The base station 602 also transmits a second reference signal 608 on a second beam. In an example, the second reference signal 608 may be quasi co-located (QCLed) with the first reference signal 604. The UE 610 receives the second reference signal 608 with the second receive beam 614. The second reference signal 608 is a LOS path to the UE 610.

In operation, the UE 610 may be configured to report the channel responses for each of the first and second reference signals 604, 608 to the base station 602 or another serving cell, and the base station 602 may be configured to manage the transmit beam and receive beam pairs for object sensing. For example, the base station 602 may be configured to provide transmit and receive beam identification information to the UE 610 to track an object such as the building 404. The beam identification information may be a transmission configuration indicator (TCI) sent in a DCI message which includes configurations such as QCL relationships between the transmit and receive beams.

Figure 7:
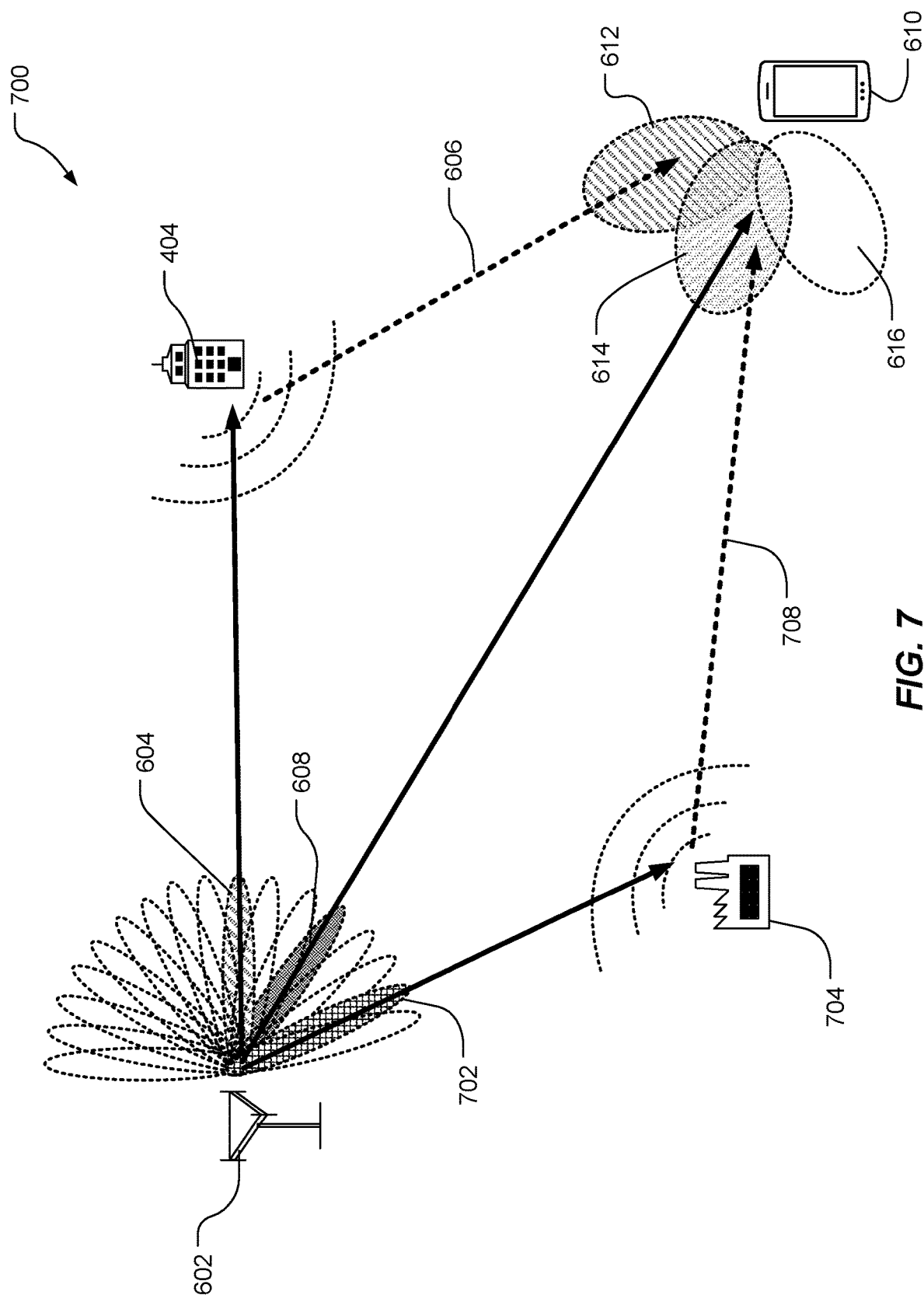
FIG. 7 illustrates an example multi-target beam management use case for bistatic radio frequency sensing.

Referring to FIG. 7, with further reference to FIG. 6, an example multi-target use case 700 for bistatic radio frequency sensing is shown. The use case 700 extends the single target use case 600 of FIG. 6 by including a second target. The second target may be a second building 704 as an example and not a limitation. The number and nature of the targets may vary based on the environment and the radio sensing application. In the use case 700, the base station 602 transmits a third reference signal 702 which is reflected by the second building 704, and the resulting reflected signal 708 is detected by the second receive beam 614 of the UE 610. The UE 610 may report the channel response for the third reference signal 702 with an indication that the measurement was obtained with the second receive beam 614. The base station 602 is configured to manage the beam pairs (i.e., the third reference signal 702, and the second receive beam 614) associated with the second target. Additional targets and the corresponding beam pairs may also be managed by the base station 602. The base station 602 may be configure to track one or more of the targets and thus may provide the corresponding beam pair information to the UE 610 as QCL/TCI for the respective targets.

Figure 8A:
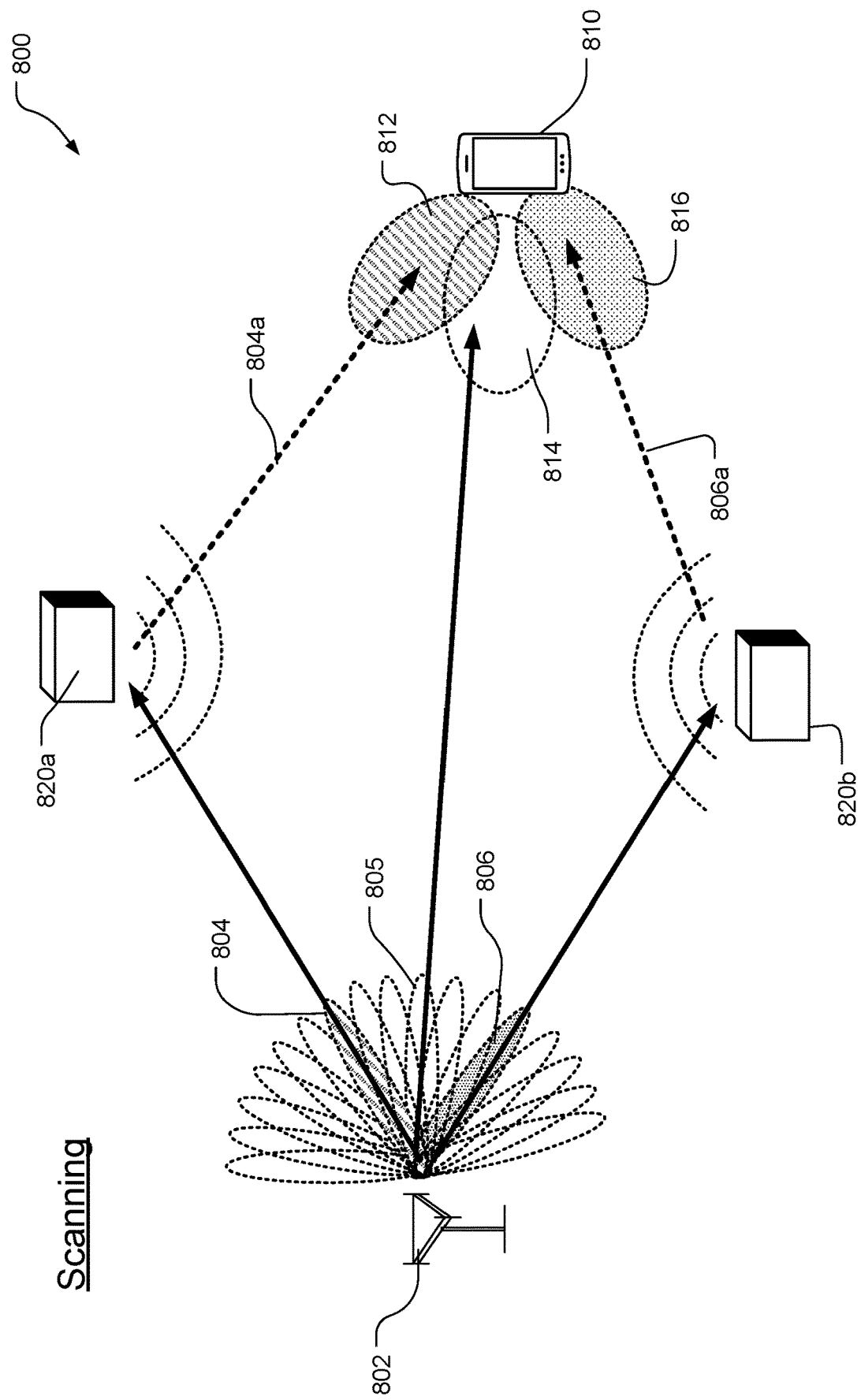
FIG. 8A illustrates an example scanning phase with bistatic radio frequency sensing.

Referring to FIG. 8A, an example scanning phase 800 with bistatic radio frequency sensing is shown. A base station 802 is an example of the base station 304 and is configured to transmit a plurality of beamformed reference signals at varying azimuths, elevations and/or beam widths. The reference signals may be SS Blocks, CSI-RS, TRS, PRS, or a sensing-scanning reference signal (SSRS) configured for RF sensing applications. A UE 810 is an example of the UE 302 and may be configured to perform receive beam scanning along different azimuths, elevation and/or beam widths relative to the orientation of the UE 810. In operation, the base station 802 may transmit one or more of the reference signals in a sequential order (i.e., beam sweeping), and the UE 810 is configured to beam sweep through different receive beams. The scanning phase 800 may be used to initially detect potential objects to be tracked via RF sensing. For example, a first reference signal 804 may be reflected by a first object 820a and a first reflected reference signal 804a may be detected by the UE 810. The UE 810 may cycle through different receive beams, such as a first receive beam 812, a second receive beam 814, and a third receive beam 816. As depicted in FIG. 8A, the first reflected reference signal 804a may be received with the first receive beam 812. The UE 810 may also detect a second reference signal 805 via a LOS path with the second receive beam 814. The beam sweeping on the base station 802 may generate a third reference signal 806 which is reflected on a second object 820b and a third reflected reference signal 806a is received by the UE 810 on the third receive beam 816.

In an aspect, the UE 810 may be configured to detect a target based on the RSRP of the received signals. For example, the UE 810 may report that the RSRP values associated with the first reference signal 804 and the third reference signal 806 are above a threshold value. The threshold value may be a fixed value, or it may be scaled based on the RSRP of a LOS signal, such as the second reference signal 805. The UE 810 is configured to report one or more channel measurements (e.g., RSRP, RSRQ, SINR) associated with the received reference signals to the base station 802, or other network node. The measurements obtained during the scanning phase 800 may be used for a subsequent tracking phase.

Figure 8B:
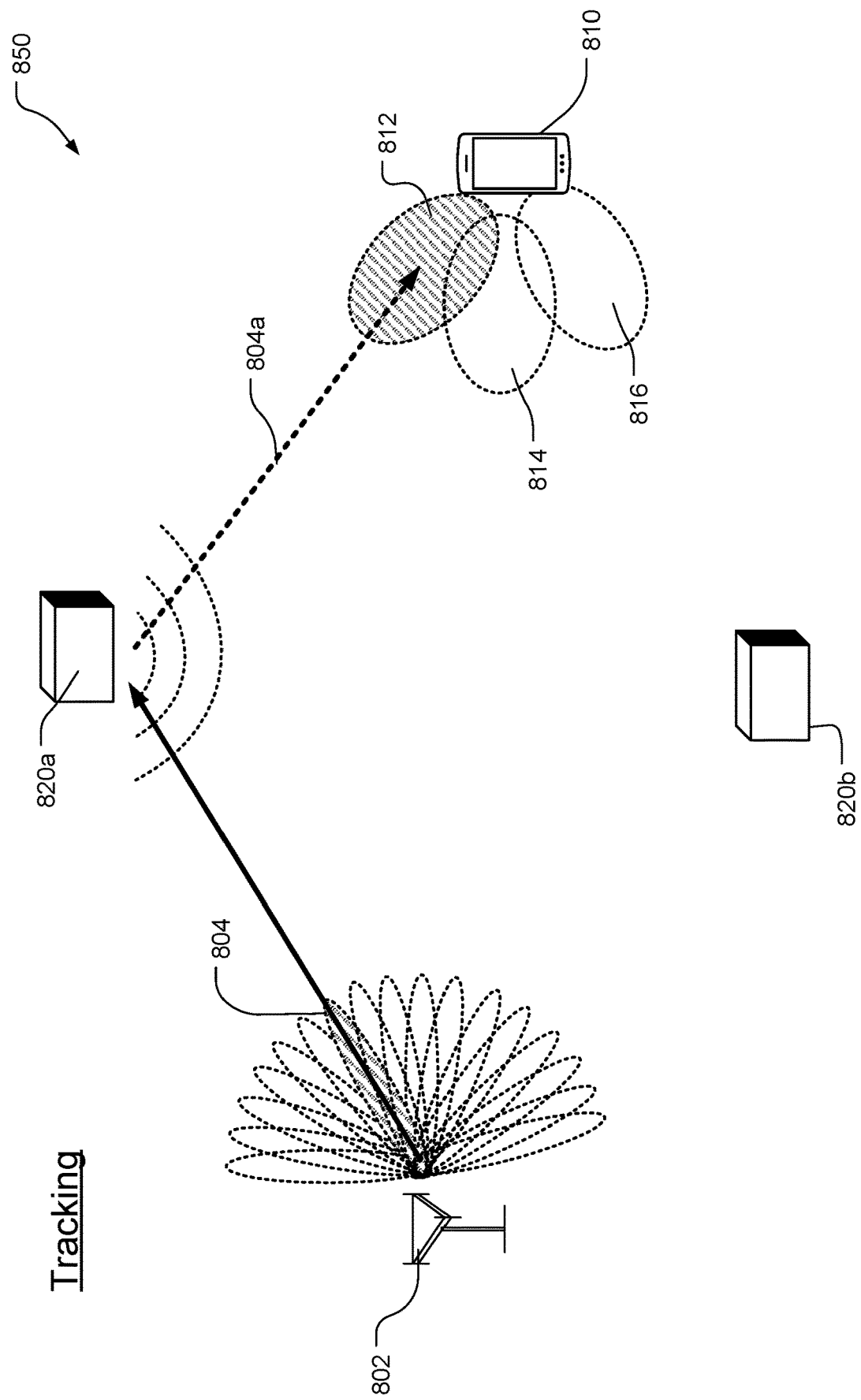
FIG. 8B illustrates an example tracking phase with bistatic radio frequency sensing.

Referring to FIG. 8B, with further reference to FIG. 8A, an example tracking phase 850 with bistatic radio frequency sensing is shown. Continuing the example of FIG. 8A, the base station 802 (or another network node in the communication system 100) may determine to track one or more of the objects detected in the scanning phase 800. For example, the base station 802 may select to track the first object 820a and will send beam configuration information to the UE 810 to enable the UE 810 to track the first object 820a. The beam configuration information may include reference signal information and receive beam configuration information for the UE 810. The base station 802 may utilize a sensing-tracking reference signal (STRS) based on the first reference signal 804 to track or refine the measurements associated with the first object. In an example, the STRS may be QCLed with a corresponding SSRS (i.e., the first reference signal 804). SS Block, CSI-RS, TRS and PRS may be used as STRS. Other reference signals may also be developed and used as the STRS. The beam configuration information sent to the UE 810 may be sent via RRC, Medium Access Control Control Element (MAC-CE), DCI, or other signaling protocols. Upon receipt of the beam configuration information, the UE 810 may for example, use the first receive beam 812 with the STRS to detect the first object 820a.

The base station 802 may be configured to track multiple targets based on the number of reference signals the base station 802 may generate. In an aspect, the base station 802 may be configured to track one object for each reference signal. For example, the base station 802 may track the second object 820b by generating a second STRS based on the third reference signal 806. The beam configuration information sent to the UE 810 may include the beam parameters for the second STRS and the corresponding receive beam information (e.g., the third receive beam 816) provided by the UE 810 during the scanning phase 800. Thus, the UE 810 may be configured to track both the first object 820a and the second object 820b. Additional objects, up to the number of reference signals generated by the base station 802, may be tracked.

Figure 9:
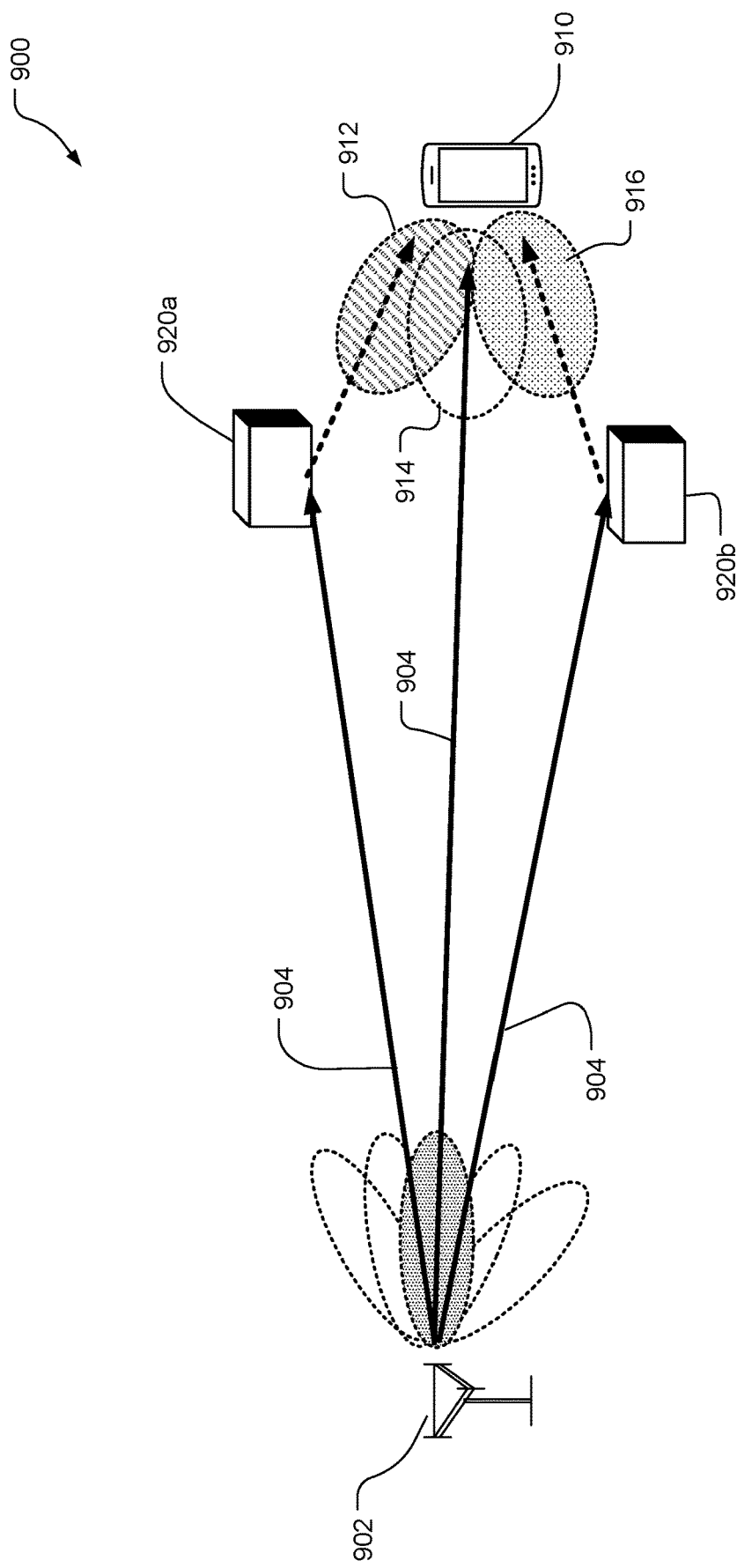
FIG. 9 illustrates an example use case for multi-target detection with bistatic radio frequency sensing.

Referring to FIG. 9, an example use case 900 for multi-target detection with bistatic radio frequency sensing is shown. In contrast to the examples in FIGS. 8A-8B, where each target may be identified with a single reference signal, the use case 900 highlights scenarios when multiple targets are detected with a single reference signal. For example, a base station 902 is an example of the base station 304 and is configured to transmit a plurality of beamformed reference signals at varying angles, elevations and/or beam widths. A first reference signal 904 may be configured as a SSRS and/or a STRS and is received by a UE 910 via multiple paths. For example, the first reference signal 904 may be reflected from a first target 920a and received by a first receive beam 912. The first reference signal 904 may be received via a LOS path by a second receive beam 914. The first reference signal 904 may also be reflected off of a second target 920b and received via a third receive beam 916. Since the first and second targets 920a-b are associated with the same reference signal, the first reference signal 904 is not sufficient to uniquely identify each target. In this use case, the UE 910 may be configured to assign an explicit target identification to distinguish the targets. The UE 910 may be configured to distinguish the targets based on different receive beams. For example, the RSRP for the first reference signal 904 may exceed a threshold when received on the first receive beam 912, and when received on the third receive beam 916. The UE 910 may assign the first target 920a a first identification (e.g., target 1), and the second target 920b a second identification (e.g., target 2). The target identifications and the corresponding reference signal identification information may be reported to the base station 902.

Figure 10:
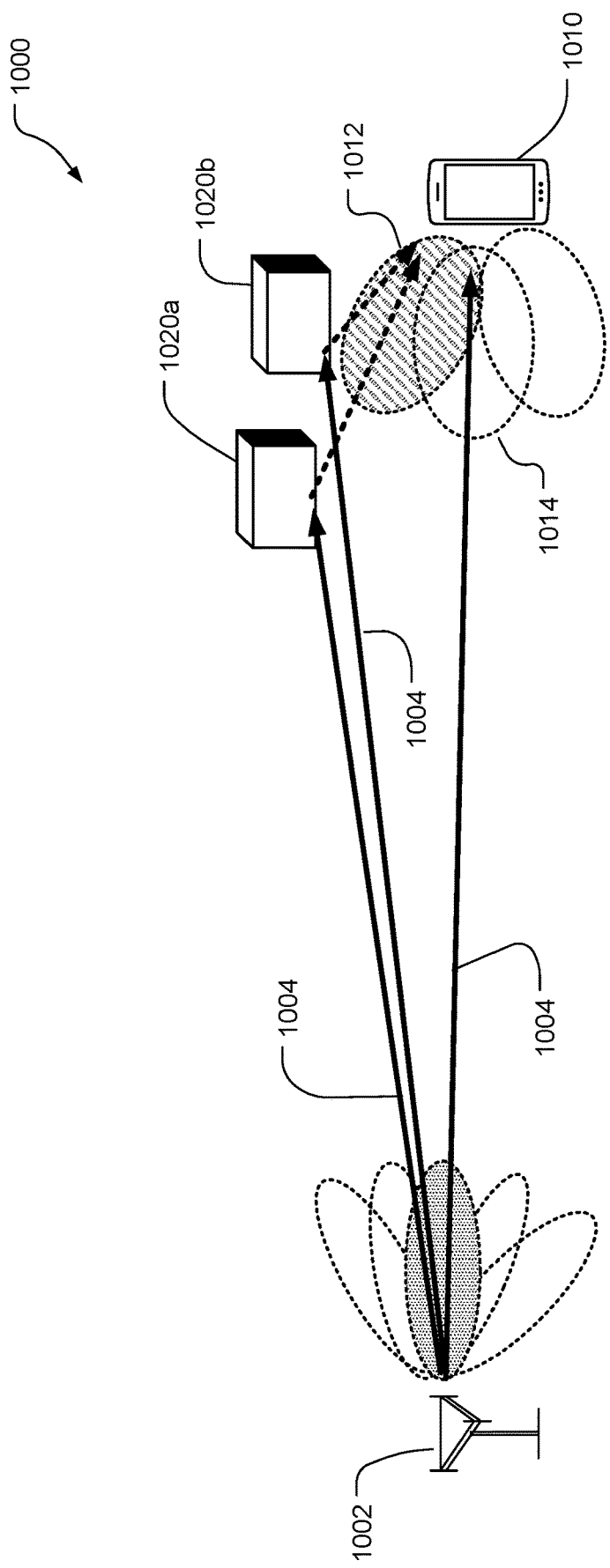
FIG. 10 illustrates an example use case for a target group detection with bistatic radio frequency sensing.

Referring to FIG. 10, an example use case 1000 for target group detection with bistatic radio frequency sensing is shown. In contrast to the examples in FIGS. 8A-8B, where each target may be identified with a single reference signal, and the use case in FIG. 9, where each target may be identified by different receive beams, the use case 1000 highlights scenarios when multiple targets are detected with a single reference signal and a single receive beam. For example, a base station 1002 is an example of the base station 304 and is configured to transmit a plurality of beamformed reference signals at varying angles, elevations and/or beam widths. A first reference signal 1004 may be configured as a SSRS and/or a STRS and is received by a UE 1010 via multiple paths. For example, the first reference signal 1004 may be reflected from a first target 1020a and from a second target 1020b and received by a first receive beam 1012. The first reference signal 1004 may also be received via a LOS path by a second receive beam 1014. Since the first and second targets 1020a-b are associated with the same reference signal and the same receive beam, the combination of first reference signal 1004 and the first receive beam 1012 is insufficient to uniquely identify each of the targets 1020a-b. In this use case, the UE 1010 may be configured to assign an target group identification to identify the first and second targets 1020a-b as a target group. The RSRP for the first reference signal 1004 may exceed a threshold when received on the first receive beam 1012. In an example, the UE 1010 may be configured to resolve a target group into separate targets based on the clusters and channel taps. The UE 1010 may assign a target group identification for the first target 1020a and the second target 1020b (e.g., target group 1). The target group identifications and the corresponding reference signal identification information may be reported to the base station 1002.

Figure 11:
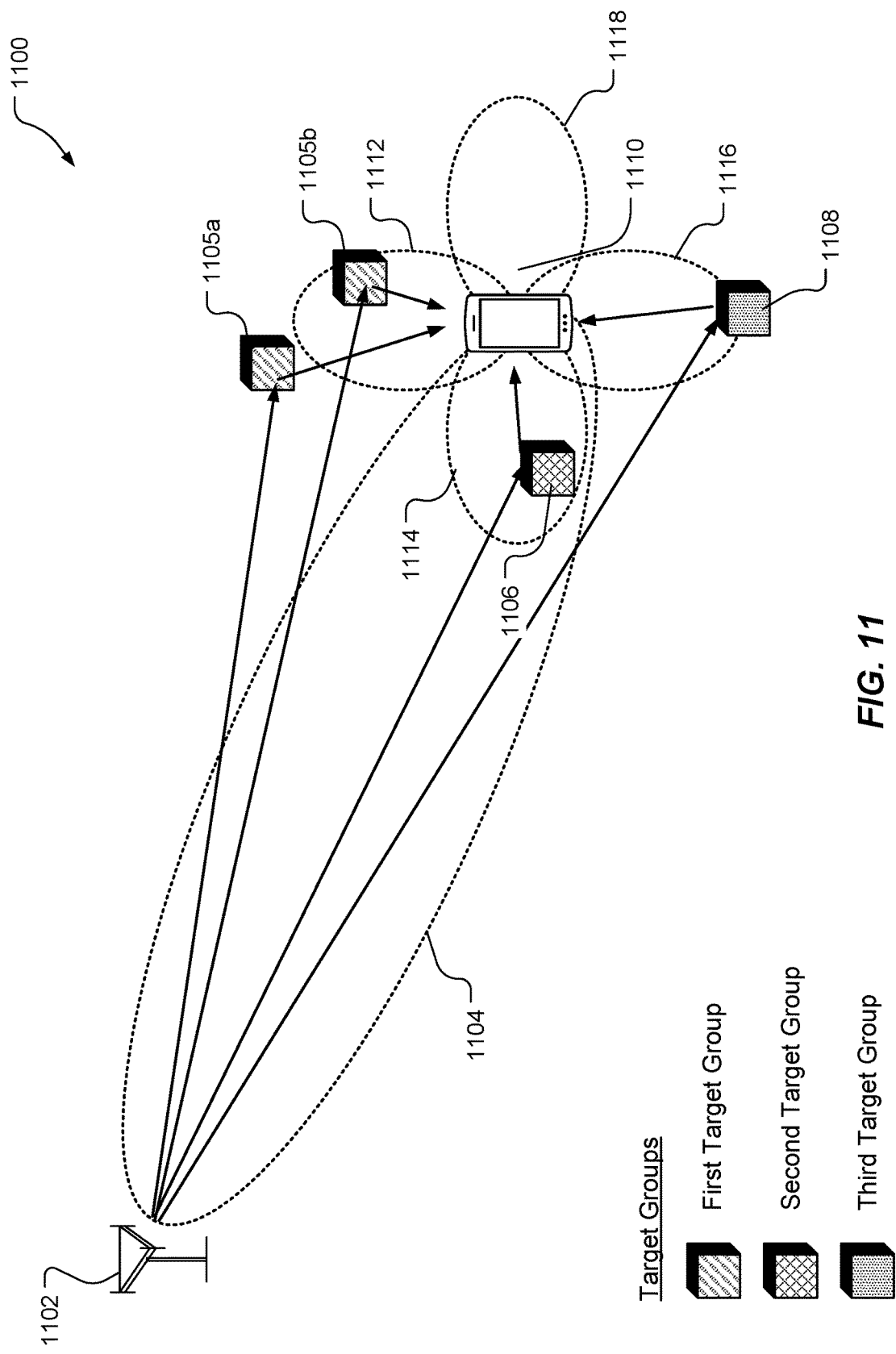
FIG. 11 illustrates an example use case of single sided beam management for bistatic radio frequency sensing.

Referring to FIG. 11, an example use case 1100 for single sided beam management for bistatic radio frequency sensing is shown. In contrast to the examples in FIGS. 8A-8B, where each target may be identified with a single reference signal, the use case 1100 highlights scenarios when multiple target groups are detected with a single reference signal. For example, a base station 1102 is an example of the base station 304 and is configured to transmit a plurality of beamformed reference signals at varying angles, elevations and/or beam widths. A first reference signal 1104 may be configured as a SSRS and/or a STRS and is received by a UE 1110 via multiple paths. For example, the first reference signal 1104 may be reflected from a first target 1105a and a second target 1105b and received by a first receive beam 1112. The first reference signal 1104 may be received by a second receive beam 1114 via a LOS path and via a NLOS path including a reflection from a third target 1106. The first reference signal 1104 may also be reflected off of a fourth target 1108 and received via a third receive beam 1116. Since all of the targets in FIG. 11 are associated with the same reference signal (i.e., the first reference signal 1104), the first reference signal 1104 is not sufficient to uniquely identify each target. In this use case, the UE 1110 may be configured to assign explicit target group identifications to distinguish between target groups. In an aspect, the target groups may be based on the receive beams 1112, 1114, 1116. For example, a first target group includes the first target 1105a and the second target 1105b, a second target group includes the third target 1106, and a third target group includes the fourth target 1108. The relative locations and number of objects in the target groups are examples only and not limitations. The UE 1110 may utilize wider or narrow receive beams and may be configured to distinguish the targets based on different receive beams and the corresponding reference signal measurements. For example, the RSRP for the first reference signal 1104 may exceed a threshold when received on the first receive beam 1112, the second receive beam 1114, and the third receive beam 1116. As depicted in FIG. 11, the first reference signal 1104 is not detected (or the RSRP is below a threshold value) on a fourth receive beam 1118. The UE 1110 may assign the first target 1105a and the second target 1105b a first target group identification (e.g., target group 1), the target 1106 a second target group identification (e.g., target group 2), and the fourth target 1108 a third target group identification (e.g., target group 3). The target group identifications and the corresponding reference signal identification information may be reported to the base station 1102. In an aspect, the UE 1110 may be configured to provide the RSRP values and an indication of the corresponding receive beam to the base station 1102, and the base station 1102 (or other network node) may be configured to assign the target group identifications.

RF sensing as described above can be regarded as consumer-level radar with advanced detection capabilities, which may enable touchless/device-free interaction with a device/system, and can leverage (or reuse) RF waveforms used for communication (e.g., 3GPP NR), such as mmWave RF signals (e.g., 3GPP NR FR2, FR2x, FR4, etc.) which may be suitable for accurate range (distance) detection. Various use cases for RF sensing include health monitoring (e.g., heartbeat detection, respiration rate monitoring, etc.), gesture recognition (e.g., human activity recognition, keystroke detection, sign language recognition, etc.), contextual information acquisition (e.g., location detection/tracking, direction finding, range estimation, etc.), automotive radar (e.g., smart cruise control, collision avoidance, etc.), and so on.

Like conventional radar, the NR-air-interface-based radar can estimate range (distance), speed (Doppler), and angle (e.g., angle of arrival (AoA)) of targets. Various monostatic and bistatic RF sensing techniques suitable for NR-based RF sensing have been described above.

Monostatic sensing generally requires full-duplex capability of the sensing node, as described above with respect to FIG. 4A. For nearby target objects, the roundtrip delay of the reflected sensing signal is short. Therefore, the sensing node may be required to transmit the sensing signal and monitor the reflection simultaneously In some applications, such as NR air-interface-based sensing, the sensing node can be a UE device (e.g., smartphone, industrial sensors, etc.) or base station (e.g., TRP, IAB node, etc.) only with a half-duplex capability. For example, in some designs, implementation of the full-duplex functionality can be very challenging even for base stations.

For a class of devices without full-duplex capability, bistatic sensing may be used for environmental sensing in some designs, as described above with respect to FIGS. 4B and 6-11. Unlike monostatic sensing, which can autonomously be performed by a single node, bistatic sensing requires some coordination between two (or more) counterparts. In NR, peer-to-peer (or sidelink (SL)) communication is supported between UEs.

Aspects of the disclosure are thereby directed to coordination between wireless nodes to facilitate a bistatic sensing procedure. Such coordination may be performed between wireless nodes of various types (e.g., gNB-to-gNB, UE-to-UE, UE-to-gNB, etc.). Such aspects may provide various technical advantages, such as more accurate target object detection and tracking, more accurate environment scanning, and so on.

Figure 12:
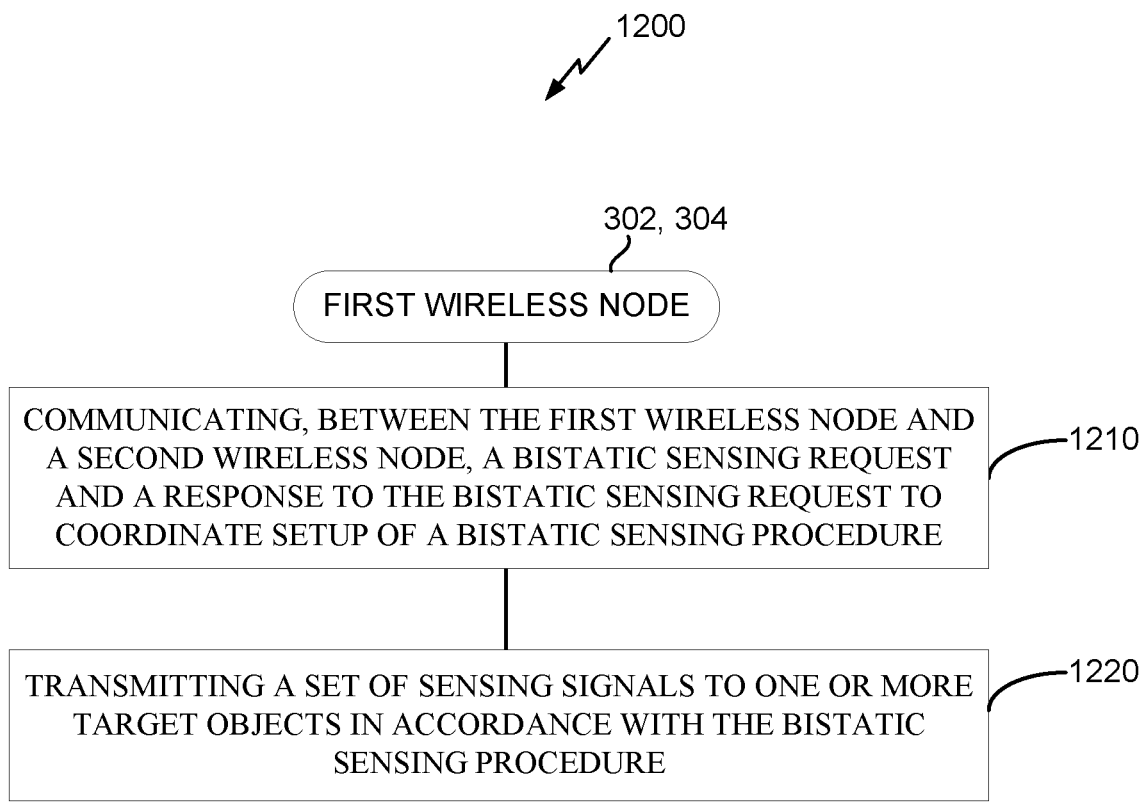
FIG. 12 illustrates an exemplary process of wireless communication, according to aspects of the disclosure.

FIG. 12 illustrates an exemplary process 1200 of wireless communications according to an aspect of the disclosure.

The process 1200 of FIG. 12 is performed by a first wireless node, which may correspond to either UE 302 or BS 304 as an example.

At 1210, the first wireless node (e.g., receiver 312 or 322 or 352 or 362, transmitter 314 or 324 or 354 or 364, network interface(s) 380, processing system 332 or 384, etc.) communicates, between the first wireless node and a second wireless node, a bistatic sensing request and a response to the bistatic sensing request to coordinate setup of a bistatic sensing procedure. In some designs, at 1210, the bistatic sensing request is transmitted by the first wireless node to the second wireless node and the response to the bistatic sensing request is received at the first wireless node from the second wireless node. In other designs, at 1210, the bistatic sensing request is received at the first wireless node from the second wireless node and the response to the bistatic sensing request is transmitted by the first wireless node to the second wireless node.

At 1220, the first wireless node (e.g., transmitter 314 or 324 or 354 or 364, network interface(s) 380, etc.) transmits a set of sensing signals to one or more target objects in accordance with the bistatic sensing procedure. As noted above, the set of sensing signals can be configured for both sensing and communication in some designs (e.g., reference signals such as PRS, TRS, CSI-RS, etc.).

Figure 13:
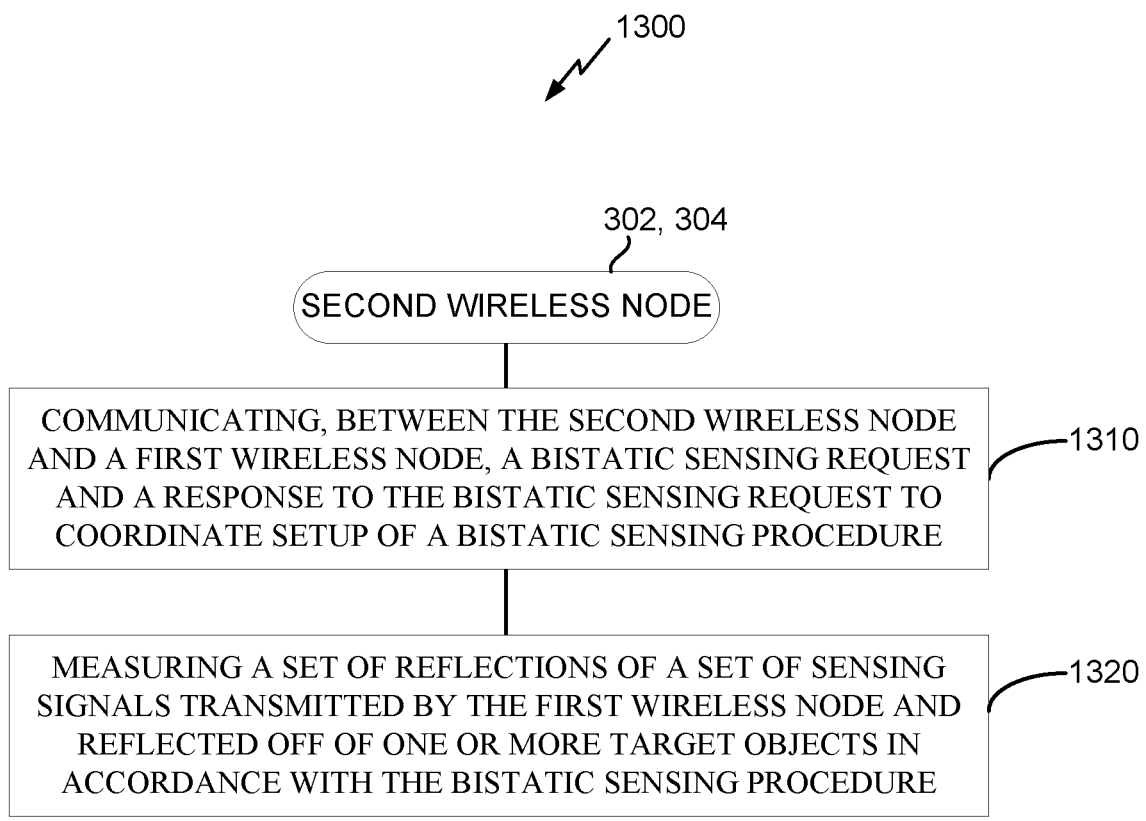
FIG. 13 illustrates an exemplary process of wireless communication, according to aspects of the disclosure.

FIG. 13 illustrates an exemplary process 1300 of wireless communications according to an aspect of the disclosure. The process 1300 of FIG. 13 is performed by a second wireless node, which may correspond to either UE 302 or BS 304 as an example.

At 1310, the second wireless node (e.g., receiver 312 or 322 or 352 or 362, transmitter 314 or 324 or 354 or 364, network interface(s) 380, processing system 332 or 384, etc.) communicates, between the second wireless node and a first wireless node, a bistatic sensing request and a response to the bistatic sensing request to coordinate setup of a bistatic sensing procedure. In some designs, at 1310, the bistatic sensing request is transmitted by the second wireless node to the first wireless node and the response to the bistatic sensing request is received at the second wireless node from the first wireless node. In other designs, at 1310, the bistatic sensing request is received at the second wireless node from the first wireless node and the response to the bistatic sensing request is transmitted by the second wireless node to the first wireless node.

At 1320, the second wireless node (e.g., receiver 312 or 322 or 352 or 362, transmitter 314 or 324 or 354 or 364, RF sensing component 342 or 388, processing system 332 or 384, etc.) measures a set of reflections of a set of sensing signals transmitted by the first wireless node and reflected off of one or more target objects in accordance with the bistatic sensing procedure.

As will be described in more detail below, the processes 1200-1300 may execute in parallel at the first and second wireless nodes, respectively.

Referring to FIGS. 12-13, as noted above, either the first or second wireless device may initiate the coordination of the bistatic sensing procedure via transmission of the bistatic sensing request. In some designs, the respective wireless node which transmits the bistatic sensing request may beam sweep (e.g., transmit at different spatial directions) the bistatic sensing request across a plurality of transmission beams, as described above. In some designs, the set of sensing signals may include a burst of sensing signals transmitted closely together in time, such as sensing RSs. In some designs, the respective wireless node which transmits the bistatic sensing request may also transmit one or more bistatic sensing requests to one or more other wireless nodes to coordinate setup of bistatic sensing procedure(s). In this context, each wireless node that receives a bistatic sensing request can be considered as an assistant node of the initiating node. In some designs, the communication link between the first and second wireless nodes may be unicast, broadcast, or multicast. For example, in a scenario where multiple 'assistant' wireless nodes are configured, a multicast or broadcast link may be used to coordinate with these multiple assistant notes concurrently.

Referring to FIGS. 12-13, in some designs, any combination of wireless node types may be deployed as the first and second wireless nodes (or additional 'assistant' wireless nodes as noted above). For example, the first wireless node may correspond to a UE and the second wireless node corresponds to a base station, or the second wireless node may correspond to a UE and the first wireless node corresponds to a base station, or the first and second wireless nodes may both correspond to base stations, or the first and second wireless nodes may both correspond to UEs. In case where both wireless nodes are base stations, these base stations may correspond to Integrated Access and Backhaul (IAB) gNBs, in some designs.

Referring to FIGS. 12-13, in some designs, a reference signal for timing calibration may be communicated between the first and second wireless nodes. In particular, in some designs, the respective wireless node which transmits the bistatic sensing request may also transmit may the reference signal for timing calibration (e.g., to be used as a reference time for the bistatic sensing procedure). For example, the bistatic sensing request and the reference signal for timing calibration may both be sent from the first wireless node to the second wireless node, or the bistatic sensing request and the reference signal for timing calibration may both be sent from the second wireless node to the first wireless node.

Referring to FIGS. 12-13, in some designs, the bistatic sensing request, the response to the bistatic sensing request, or both, may be communicated over a wireless communications link or a wired communications link. For example, the wired communications link may comprise a backhaul link in a scenario where the first and second wireless nodes correspond to gNBs. In some designs, the wireless or wired communications link may be pre-configured before the bistatic sensing procedure is triggered or may alternatively be setup in association with the bistatic sensing procedure.

Referring to FIGS. 12-13, in an example where the bistatic sensing request, the response to the bistatic sensing request, or both, are communicated over the wireless communications link, the bistatic sensing request, the response to the bistatic sensing request, or both, may be associated with downlink control information (DCI), uplink control information (UCI), sidelink control information (SCI), a Physical Sidelink Feedback Channel (PSFCH), a medium access control command element (MAC CE), or radio resource configuration (RRC) signaling. In some designs, the bistatic sensing request may include a configuration of the sensing signal(s) transmitted at 1220 and/or received at 1320.

Referring to FIGS. 12-13, in some designs, the response to the bistatic sensing request at 1210 or 1310 may include an indication of a location of the respective wireless node that transmits the response to the bistatic sensing request, an indication of acceptance or rejection of the bistatic sensing request, or a combination thereof. For example, the response to the bistatic sensing request at 1210 or 1310 may include the indication of the location of the respective wireless node if the respective wireless node has a self-positioning capability (e.g., GPS or NR-positioning).

Referring to FIGS. 12-13, in some designs, a reference signal for timing calibration (e.g., PSS/SSS, CSI-RS, etc.) may be communicated between the first and second wireless nodes. In particular, in some designs, the respective wireless node which transmits the response to the bistatic sensing request may also transmit the reference signal. In some designs, the reference signal may correspond to a reference signal for timing calibration (e.g., for timing calibration in association with the bistatic sensing procedure). In other designs, the reference signal may correspond to a reference signal for positioning. In some designs, a timing of the reference signal may be pre-configured or alternatively may be indicated by the bistatic sensing request (e.g., offset by some indicated amount of time from the bistatic sensing request). For example, in some designs, the response to the bistatic sensing request may be used at the respective wireless node that transmits the bistatic sensing request to measure a round trip time (RTT) between the first and second wireless nodes (e.g., the response to the bistatic sensing request may include information such as an Rx-Tx measurement, hardware group delay, etc. to facilitate the RTT measurement) to estimate a distance between the first and second wireless nodes.

Referring to FIGS. 12-13, in some designs, the second wireless node may optionally transmit a measurement report that includes one or more measurements based on the measuring at 1320. In some designs, the one or more measurements comprise one or more time difference of arrival (TDOA) measurements between a reference time (e.g., based on ToA(s) of the sensing signal(s) that arrive at the second wireless node over an LOS link) and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof. In some designs, the second wireless node may transmit the measurement report to the first wireless node. In other designs, the second wireless node may transmit the measurement report to another entity, such as an LMF, a core network component, a centralized sensing component, etc. For example, in some designs, if the distance between the first and second wireless nodes is known at the second wireless node, the second wireless node may calculate position(s) of the target object(s). In this case, the measurement report may include the calculated position(s). In other designs, the second wireless node may report the TDOA value(s) in the measurement report (e.g., in which case the entity to which the measurement report is transmitted may perform the target object position calculation(s)). In some designs, some or all of the measurement information from the measurement may be further disseminated (e.g., cooperative sensing).

Referring to FIGS. 12-13, in some designs, the bistatic sensing procedure is triggered periodically, semi-persistently, or aperiodically. In an example where the bistatic sensing procedure is triggered periodically or semi-persistently, in some designs, the bistatic sensing procedure at 1220 or 1320 may correspond to one of a plurality of bistatic sensing procedures for which setup is coordinated by the communication at 1210 or 1320. In other words, multiple bistatic sensing procedures may be setup via a single setup phase. However, some reference signal(s) may still be exchanged for bistatic sensing procedures that omit this setup phase. In particular, in some designs, one or more reference signals for timing, positioning, or both, may be communicated between the first and second wireless nodes for each of the plurality of bistatic sensing procedures, whereby the bistatic sensing request and the response to the bistatic sensing request may be communicated for an initial bistatic sensing procedure of the plurality of bistatic sensing procedures and then omitted for one or more subsequent bistatic sensing procedures of the plurality of bistatic sensing procedures.

Figure 14:
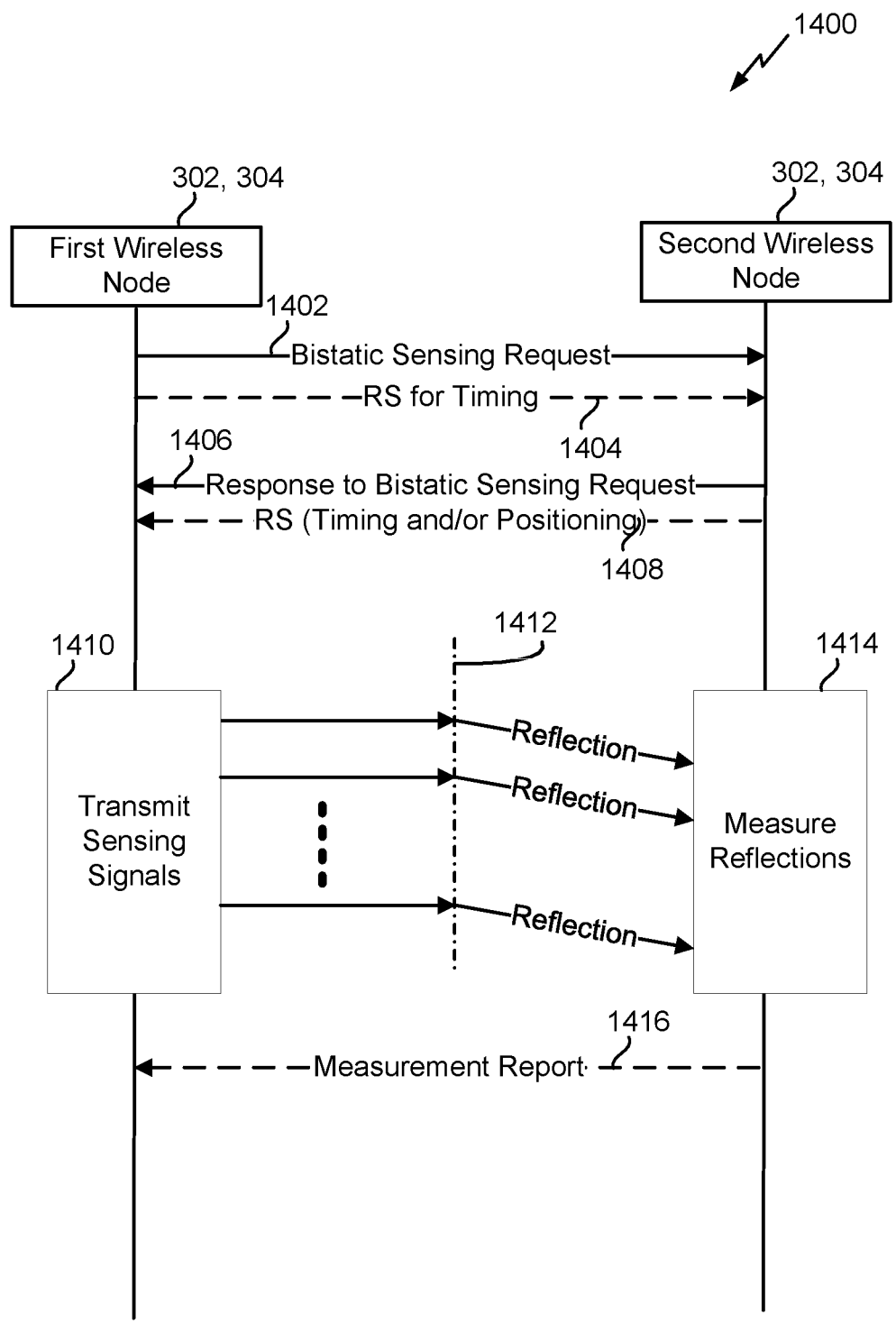
FIG. 14 illustrates an example implementation of the processes of FIGS. 12-13, respectively, in accordance with an aspect of the disclosure.

FIG. 14 illustrates an example implementation of the processes 1200-1300 in accordance with an aspect of the disclosure. In FIG. 14, the first wireless node corresponds to the bistatic sensing procedure originator or initiator. At 1402 (e.g., as in 1210 of FIG. 12 or 1310 of FIG. 13), the first wireless node transmits a bistatic sensing request to the second wireless node. At 1404, the first wireless node optionally transmits a reference signal for timing calibration to the second wireless node, which may optionally be measured and used for timing calibration at the second wireless node. At 1406 (e.g., as in 1210 of FIG. 12 or 1310 of FIG. 13), the second wireless node transmits a response to the bistatic sensing request from 1402. At 1408, the second wireless node optionally transmits a reference signal (e.g., for timing and/or positioning) to the first wireless node, which may optionally be measured and used for timing calibration at the first wireless node and/or positioning (e.g., RTT for distance calibration). At 1410 (e.g., as in 1220 of FIG. 12), the first wireless node transmits a burst of sensing signals (e.g., across a plurality of beams, at different times, etc.). At least some of the transmitted sensing signals contact one or more target objects 1412, which generates reflected signals. These reflected signals are received and measured by the second wireless node at 1414 (e.g., as in 1320 of FIG. 13). At 1416, the second wireless node optionally transmits a measurement report to the first wireless node (and/or one or more other components, such as LMF, etc. as noted above).

Figure 15:
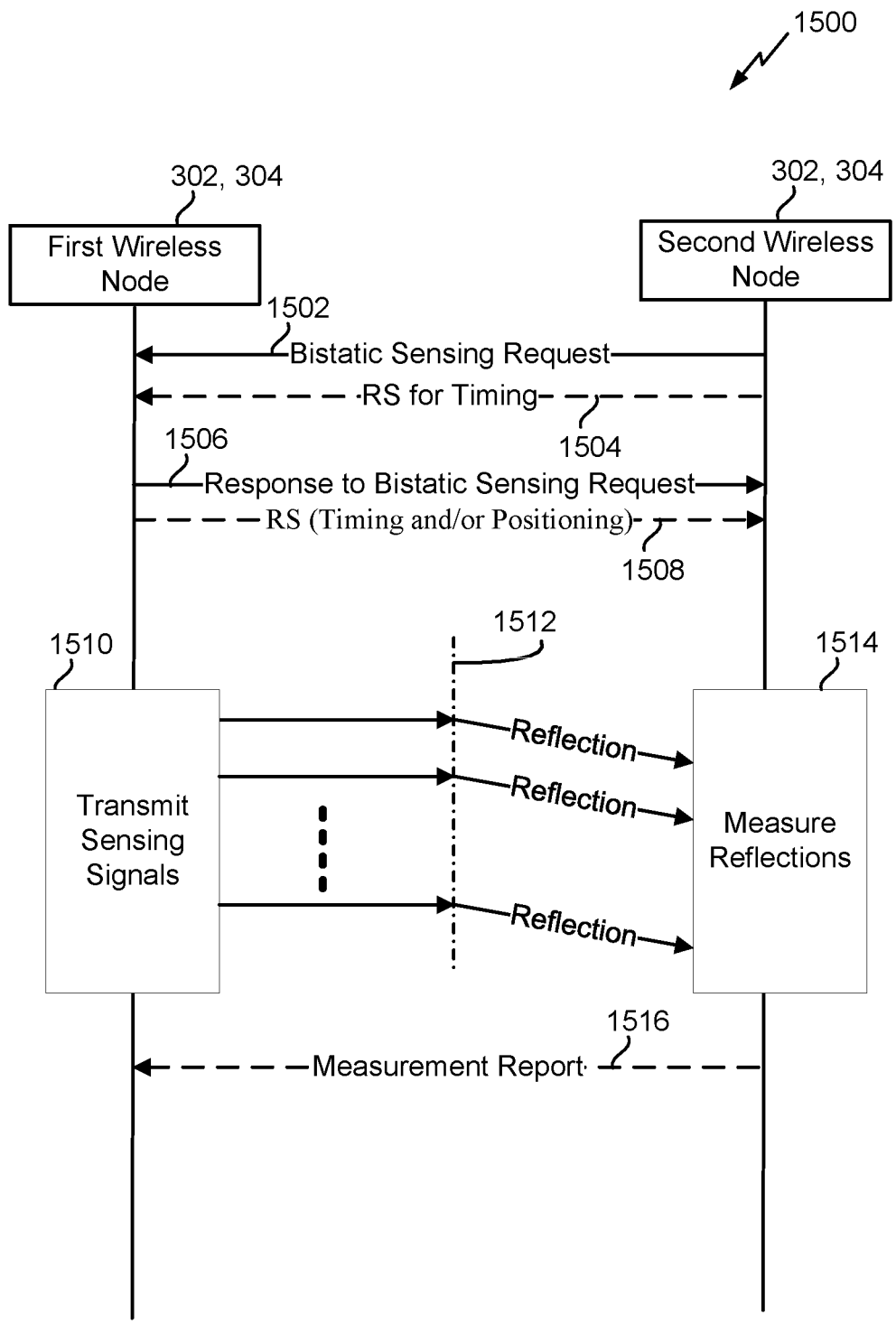
FIG. 15 illustrates an example implementation of the processes of FIGS. 12-13, respectively, in accordance with another aspect of the disclosure.

FIG. 15 illustrates an example implementation of the processes 1200-1300 in accordance with another aspect of the disclosure. Unlike FIG. 14, in FIG. 15, the second wireless node corresponds to the bistatic sensing procedure originator or initiator. At 1502 (e.g., as in 1210 of FIG. 12 or 1310 of FIG. 13), the second wireless node transmits a bistatic sensing request to the second wireless node. At 1504, the second wireless node optionally transmits a reference signal for timing calibration to the first wireless node, which may optionally be measured and used for timing calibration at the first wireless node. At 1506 (e.g., as in 1210 of FIG. 12 or 1310 of FIG. 13), the first wireless node transmits a response to the bistatic sensing request from 1502. At 1508, the first wireless node optionally transmits a reference signal (e.g., for timing and/or positioning) to the second wireless node, which may optionally be measured and used for timing calibration at the second wireless node and/or positioning (e.g., RTT for distance calibration). At 1510 (e.g., as in 1220 of FIG. 12), the first wireless node transmits a burst of sensing signals (e.g., across a plurality of beams, at different times, etc.). At least some of the transmitted sensing signals contact one or more target objects 1512, which generates reflected signals. These reflected signals are received and measured by the second wireless node at 1514 (e.g., as in 1320 of FIG. 13). At 1516, the second wireless node optionally transmits a measurement report to the first wireless node (and/or one or more other components, such as LMF, etc. as noted above). In some designs, the transmission of 1516 can be skipped (e.g., because the second wireless node is the originator which interested in the measurement data). Alternatively, the measurement report at 1516 may be sent to a separate entity (e.g., a centralized entity such as an LMF, instead of and/or in addition to being reported to the first wireless node).

While a single bistatic sensing procedure is depicted in each of FIGS. 14-15, as noted above the coordination at 1402-1408 or 1502-1508 may be used to configure multiple bistatic sensing procedures (e.g., periodic or semi-persistent) in other examples (e.g., in which case the signaling at 1402 and 1406 or 1502 and 1506 can be omitted for such additional bistatic sensing procedures, although the signaling at 1404 and 1408 or 1504 and 1508 may optionally still be implemented at each bistatic sensing procedure).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a first wireless node, comprising: communicating, between the first wireless node and a second wireless node, a bistatic sensing request and a response to the bistatic sensing request to coordinate setup of a bistatic sensing procedure; and transmitting a set of sensing signals to one or more target objects in accordance with the bistatic sensing procedure.

Clause 2. The method of clause 1, wherein the bistatic sensing request is transmitted by the first wireless node to the second wireless node and the response to the bistatic sensing request is received at the first wireless node from the second wireless node.

Clause 3. The method of clause 2, wherein the bistatic sensing request is beam swept by the first wireless node across a plurality of transmission beams.

Clause 4. The method of any of clauses 2 to 3, further comprising: transmitting, to a third wireless node, another bistatic sensing request to coordinate setup of another bistatic sensing procedure Clause 5. The method of any of clauses 1 to 4, wherein the bistatic sensing request is received at the first wireless node from the second wireless node and the response to the bistatic sensing request is transmitted by the first wireless node to the second wireless node.

Clause 6. The method of any of clauses 1 to 5, wherein the first wireless node corresponds to a user equipment (UE) and the second wireless node corresponds to a base station, or wherein the second wireless node corresponds to a UE and the first wireless node corresponds to a base station, or wherein the first and second wireless nodes correspond to base stations, or wherein the first and second wireless nodes correspond to UEs.

Clause 7. The method of any of clauses 1 to 6, further comprising: communicating, with the second wireless node, a reference signal for timing calibration.

Clause 8. The method of clause 7, wherein the bistatic sensing request and the reference signal for timing calibration are both received at the first wireless node from the second wireless node, or wherein the bistatic sensing request and the reference signal for timing calibration are both transmitted by the first wireless node to the second wireless node.

Clause 9. The method of any of clauses 1 to 8, wherein the bistatic sensing request, the response to the bistatic sensing request, or both, are communicated over a wireless communications link or a wired communications link.

Clause 10. The method of clause 9, wherein the wireless or wired communications link is pre-configured before the bistatic sensing procedure is triggered or is setup in association with the bistatic sensing procedure.

Clause 11. The method of any of clauses 9 to 10, wherein the bistatic sensing request, the response to the bistatic sensing request, or both, are communicated over the wireless communications link, and wherein the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

Clause 12. The method of any of clauses 1 to 11, wherein the response to the bistatic sensing request comprises an indication of a location of the respective wireless node that transmits the response to the bistatic sensing request, an indication of acceptance or rejection of the bistatic sensing request, or a combination thereof.

Clause 13. The method of any of clauses 1 to 12, further comprising: communicating, with the second wireless node, a reference signal.

Clause 14. The method of clause 13, wherein the response to the bistatic sensing request and the reference signal for timing calibration are both received at the first wireless node from the second wireless node, or wherein the response to the bistatic sensing request and the reference signal for timing calibration are both transmitted by the first wireless node to the second wireless node.

Clause 15. The method of any of clauses 13 to 14, wherein the reference signal corresponds to a reference signal for timing calibration, or wherein the reference signal corresponds to a reference signal for positioning.

Clause 16. The method of any of clauses 13 to 15, wherein a timing of the reference signal is pre-configured or indicated by the bistatic sensing request.

Clause 17. The method of any of clauses 1 to 16, further comprising: receiving, from the second wireless node, a measurement report that comprises one or more measurements by the second wireless node of a set of reflections of the set of sensing signals off of the one or more target objects.

Clause 18. The method of clause 17, wherein the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

Clause 19. The method of any of clauses 1 to 18, wherein the bistatic sensing procedure is triggered periodically, semi-persistently, or aperiodically.

Clause 20. The method of clause 19, wherein the bistatic sensing procedure is triggered periodically or semi-persistently, and wherein the bistatic sensing procedure corresponds to one of a plurality of bistatic sensing procedures for which setup is coordinated by the communication of the bistatic sensing request and the response to the bistatic sensing request.

Clause 21. The method of clause 20, wherein reference signals for timing, positioning, or both, are communicated between the first and second wireless nodes for each of the plurality of bistatic sensing procedures, and wherein the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

Clause 22. A method of operating a second wireless node, comprising: communicating, between the second wireless node and a first wireless node, a bistatic sensing request and a response to the bistatic sensing request to coordinate setup of a bistatic sensing procedure; and measuring a set of reflections of a set of sensing signals transmitted by the first wireless node and reflected off of one or more target objects in accordance with the bistatic sensing procedure.

Clause 23. The method of clause 22, wherein the bistatic sensing request is transmitted by the second wireless node to the first wireless node and the response to the bistatic sensing request is received at the second wireless node from the first wireless node.

Clause 24. The method of clause 23, wherein the bistatic sensing request is beam swept by the second wireless node across a plurality of transmission beams.

Clause 25. The method of any of clauses 23 to 24, further comprising: transmitting, to a third wireless node, another bistatic sensing request to coordinate setup of another bistatic sensing procedure Clause 26. The method of any of clauses 22 to 25, wherein the bistatic sensing request is received at the second wireless node from the first wireless node and the response to the bistatic sensing request is transmitted by the second wireless node to the first wireless node.

Clause 27. The method of any of clauses 22 to 26, wherein the first wireless node corresponds to a user equipment (UE) and the second wireless node corresponds to a base station, or wherein the second wireless node corresponds to a UE and the first wireless node corresponds to a base station, or wherein the first and second wireless nodes correspond to base stations, or wherein the first and second wireless nodes correspond to UEs.

Clause 28. The method of any of clauses 22 to 27, further comprising: communicating, with the first wireless node, a reference signal for timing calibration.

Clause 29. The method of clause 28, wherein the bistatic sensing request and the reference signal for timing calibration are both received at the second wireless node from the first wireless node, or wherein the bistatic sensing request and the reference signal for timing calibration are both transmitted by the second wireless node to the first wireless node.

Clause 30. The method of any of clauses 22 to 29, wherein the bistatic sensing request, the response to the bistatic sensing request, or both, are communicated over a wireless communications link or a wired communications link.

Clause 31. The method of clause 30, wherein the wireless or wired communications link is pre-configured before the bistatic sensing procedure is triggered or is setup in association with the bistatic sensing procedure.

Clause 32. The method of any of clauses 30 to 31, wherein the bistatic sensing request, the response to the bistatic sensing request, or both, are communicated over the wireless communications link, and wherein the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

Clause 33. The method of any of clauses 22 to 32, wherein the response to the bistatic sensing request comprises an indication of a location of the respective wireless node that transmits the response to the bistatic sensing request, an indication of acceptance or rejection of the bistatic sensing request, or a combination thereof.

Clause 34. The method of any of clauses 22 to 33, further comprising: communicating, with the first wireless node, a reference signal.

Clause 35. The method of clause 34, wherein the response to the bistatic sensing request and the reference signal for timing calibration are both received at the second wireless node from the first wireless node, or wherein the response to the bistatic sensing request and the reference signal for timing calibration are both transmitted by the second wireless node to the first wireless node.

Clause 36. The method of any of clauses 34 to 35, wherein the reference signal corresponds to a reference signal for timing calibration, or wherein the reference signal corresponds to a reference signal for positioning.

Clause 37. The method of any of clauses 34 to 36, wherein a timing of the reference signal is pre-configured or indicated by the bistatic sensing request.

Clause 38. The method of any of clauses 22 to 37, further comprising: transmitting, to a device, a measurement report that comprises one or more measurements based on the measuring.

Clause 39. The method of clause 38, wherein the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

Clause 40. The method of any of clauses 22 to 39, wherein the bistatic sensing procedure is triggered periodically, semi-persistently, or aperiodically.

Clause 41. The method of clause 40, wherein the bistatic sensing procedure is triggered periodically or semi-persistently, and wherein the bistatic sensing procedure corresponds to one of a plurality of bistatic sensing procedures for which setup is coordinated by the communication of the bistatic sensing request and the response to the bistatic sensing request.

Clause 42. The method of clause 41, wherein reference signals for timing, positioning, or both, are communicated between the first and second wireless nodes for each of the plurality of bistatic sensing procedures, and wherein the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

Clause 43. An apparatus comprising a memory and at least one processor communicatively coupled to the memory, the memory and the at least one processor configured to perform a method according to any of clauses 1 to 42.

Clause 44. An apparatus comprising means for performing a method according to any of clauses 1 to 42.

Clause 45. A non-transitory computer-readable medium storing computer-executable instructions, the computer-executable comprising at least one instruction for causing a computer or processor to perform a method according to any of clauses 1 to 42.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first wireless node, comprising:
   communicating, between the first wireless node and a second wireless node, a bistatic sensing request and a response to the bistatic sensing request to coordinate setup of a bistatic sensing procedure; and
   transmitting a set of sensing signals to one or more target objects in accordance with the bistatic sensing procedure,
   wherein the bistatic sensing procedure is triggered periodically, semi-persistently, or a periodically, and
   wherein the bistatic sensing procedure corresponds to one of a plurality of bistatic sensing procedures for which setup is coordinated by the communication of the bistatic sensing request and the response to the bistatic sensing request.

2. The method of claim 1, wherein the bistatic sensing request is transmitted by the first wireless node to the second wireless node and the response to the bistatic sensing request is received at the first wireless node from the second wireless node.

3. The method of claim 2, wherein the bistatic sensing request is beam swept by the first wireless node across a plurality of transmission beams.

4. The method of claim 2, further comprising:
transmitting, to a third wireless node, another bistatic sensing request to coordinate setup of another bistatic sensing procedure.

5. The method of claim 1, wherein the bistatic sensing request is received at the first wireless node from the second wireless node and the response to the bistatic sensing request is transmitted by the first wireless node to the second wireless node.

6. The method of claim 1,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

7. The method of claim 1, further comprising:
communicating, with the second wireless node, a reference signal for timing calibration.

8. The method of claim 7,
wherein the bistatic sensing request and the reference signal for timing calibration are both received at the first wireless node from the second wireless node, or
wherein the bistatic sensing request and the reference signal for timing calibration are both transmitted by the first wireless node to the second wireless node.

9. The method of claim 1, wherein the bistatic sensing request, the response to the bistatic sensing request, or both, are communicated over a wireless communications link or a wired communications link.

10. The method of claim 9, wherein the wireless or wired communications link is pre-configured before the bistatic sensing procedure is triggered or is setup in association with the bistatic sensing procedure.

11. The method of claim 9,
wherein the bistatic sensing request, the response to the bistatic sensing request, or both, are communicated over the wireless communications link, and
wherein the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

12. The method of claim 1, wherein the response to the bistatic sensing request comprises an indication of a location of the respective wireless node that transmits the response to the bistatic sensing request, an indication of acceptance or rejection of the bistatic sensing request, or a combination thereof.

13. The method of claim 1, further comprising:
communicating, with the second wireless node, a reference signal.

14. The method of claim 13,
wherein the response to the bistatic sensing request and the reference signal for timing calibration are both received at the first wireless node from the second wireless node, or
wherein the response to the bistatic sensing request and the reference signal for timing calibration are both transmitted by the first wireless node to the second wireless node.

15. The method of claim 13,
wherein the reference signal corresponds to a reference signal for timing calibration, or
wherein the reference signal corresponds to a reference signal for positioning.

16. The method of claim 13, wherein a timing of the reference signal is pre-configured or indicated by the bistatic sensing request.

17. The method of claim 1, further comprising:
receiving, from the second wireless node, a measurement report that comprises one or more measurements by the second wireless node of a set of reflections of the set of sensing signals off of the one or more target objects.

18. The method of claim 17, wherein the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

19. The method of claim 1,
wherein reference signals for timing, positioning, or both, are communicated between the first and second wireless nodes for each of the plurality of bistatic sensing procedures, and
wherein the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

20. A method of operating a second wireless node, comprising:
communicating, between the second wireless node and a first wireless node, a bistatic sensing request and a response to the bistatic sensing request to coordinate setup of a bistatic sensing procedure; and
measuring a set of reflections of a set of sensing signals transmitted by the first wireless node and reflected off of one or more target objects in accordance with the bistatic sensing procedure, and
communicating, with the first wireless node, a reference signal, wherein a timing of the reference signal is pre-configured or indicated by the bistatic sensing request.

21. The method of claim 20, wherein the bistatic sensing request is transmitted by the second wireless node to the first wireless node and the response to the bistatic sensing request is received at the second wireless node from the first wireless node.

22. The method of claim 21, wherein the bistatic sensing request is beam swept by the second wireless node across a plurality of transmission beams.

23. The method of claim 21, further comprising:
transmitting, to a third wireless node, another bistatic sensing request to coordinate setup of another bistatic sensing procedure.

24. The method of claim 20, wherein the bistatic sensing request is received at the second wireless node from the first wireless node and the response to the bistatic sensing request is transmitted by the second wireless node to the first wireless node.

25. The method of claim 20,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

26. The method of claim 20, further comprising:
communicating, with the first wireless node, a reference signal for timing calibration.

27. The method of claim 26,
wherein the bistatic sensing request and the reference signal for timing calibration are both received at the second wireless node from the first wireless node, or
wherein the bistatic sensing request and the reference signal for timing calibration are both transmitted by the second wireless node to the first wireless node.

28. The method of claim 20, wherein the bistatic sensing request, the response to the bistatic sensing request, or both, are communicated over a wireless communications link or a wired communications link.

29. The method of claim 28, wherein the wireless or wired communications link is pre-configured before the bistatic sensing procedure is triggered or is setup in association with the bistatic sensing procedure.

30. The method of claim 28,
wherein the bistatic sensing request, the response to the bistatic sensing request, or both, are communicated over the wireless communications link, and
wherein the bistatic sensing request, the response to the bistatic sensing request, or both, are associated with downlink control information (DCI), uplink control information (UCI), sidelink control information (SCI), a medium access control command element (MAC CE), a Physical Sidelink Feedback Channel (PSFCH), or radio resource configuration (RRC) signaling.

31. The method of claim 20, wherein the response to the bistatic sensing request comprises an indication of a location of the respective wireless node that transmits the response to the bistatic sensing request, an indication of acceptance or rejection of the bistatic sensing request, or a combination thereof.

32. The method of claim 20,
wherein the response to the bistatic sensing request and the reference signal for timing calibration are both received at the second wireless node from the first wireless node, or
wherein the response to the bistatic sensing request and the reference signal for timing calibration are both transmitted by the second wireless node to the first wireless node.

33. The method of claim 20,
wherein the reference signal corresponds to a reference signal for timing calibration, or
wherein the reference signal corresponds to a reference signal for positioning.

34. The method of claim 20, further comprising:
transmitting, to a device, a measurement report that comprises one or more measurements based on the measuring.

35. The method of claim 34, wherein the one or more measurements comprise one or more time difference of arrival (TDOA) measurements between a reference time and a set of time of arrivals (ToAs) associated with the set of reflections at the second wireless node, at least one distance between the second wireless node and the one or more target objects, at least one angle of arrival (AoA) of the one or more target objects, at least one positioning estimate of the one or more target objects, or a combination thereof.

36. A method of operating a second wireless node, comprising:
communicating, between the second wireless node and a first wireless node, a bistatic sensing request and a response to the bistatic sensing request to coordinate setup of a bistatic sensing procedure; and
measuring a set of reflections of a set of sensing signals transmitted by the first wireless node and reflected off of one or more target objects in accordance with the bistatic sensing procedure,
wherein the bistatic sensing procedure is triggered periodically, semi-persistently, or a periodically.

37. The method of claim 36,
wherein the bistatic sensing procedure is triggered periodically or semi-persistently, and
wherein the bistatic sensing procedure corresponds to one of a plurality of bistatic sensing procedures for which setup is coordinated by the communication of the bistatic sensing request and the response to the bistatic sensing request.

38. The method of claim 37,
wherein reference signals for timing, positioning, or both, are communicated between the first and second wireless nodes for each of the plurality of bistatic sensing procedures, and
wherein the bistatic sensing request and the response to the bistatic sensing request are communicated for an initial bistatic sensing procedure of the plurality of bistatic sensing procedures and then omitted for one or more subsequent bistatic sensing procedures of the plurality of bistatic sensing procedures.

39. A first wireless node, comprising:
a memory;
at least one transceiver; and
at least one processor communicatively coupled to the memory and the at least one transceiver, the at least one processor configured to:
communicate, between the first wireless node and a second wireless node, a bistatic sensing request and a response to the bistatic sensing request to coordinate setup of a bistatic sensing procedure; and
transmit a set of sensing signals to one or more target objects in accordance with the bistatic sensing procedure, wherein the bistatic sensing procedure is triggered periodically, semi-persistently, or a periodically.

40. The first wireless node of claim 39, wherein the bistatic sensing request is transmitted by the first wireless node to the second wireless node and the response to the bistatic sensing request is received at the first wireless node from the second wireless node.

41. The first wireless node of claim 39, wherein the bistatic sensing request is received at the first wireless node from the second wireless node and the response to the bistatic sensing request is transmitted by the first wireless node to the second wireless node.

42. The first wireless node of claim 39,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

43. A second wireless node, comprising:
a memory;
at least one transceiver; and
at least one processor communicatively coupled to the memory and the at least one transceiver, the at least one processor configured to:
communicate, between the second wireless node and a first wireless node, a bistatic sensing request and a response to the bistatic sensing request to coordinate setup of a bistatic sensing procedure; and
measure a set of reflections of a set of sensing signals transmitted by the first wireless node and reflected off of one or more target objects in accordance with the bistatic sensing procedure, wherein the bistatic sensing procedure is triggered periodically, semi-persistently, or a periodically.

44. The second wireless node of claim 43, wherein the bistatic sensing request is transmitted by the second wireless node to the first wireless node and the response to the bistatic sensing request is received at the second wireless node from the first wireless node.

45. The second wireless node of claim 43, wherein the bistatic sensing request is received at the second wireless node from the first wireless node and the response to the bistatic sensing request is transmitted by the second wireless node to the first wireless node.

46. The second wireless node of claim 43,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

47. A first wireless node, comprising:
means for communicating, between the first wireless node and a second wireless node, a bistatic sensing request and a response to the bistatic sensing request to coordinate setup of a bistatic sensing procedure; and
means for transmitting a set of sensing signals to one or more target objects in accordance with the bistatic sensing procedure, wherein the bistatic sensing procedure is triggered periodically, semi-persistently, or a periodically.

48. The first wireless node of claim 47, wherein the bistatic sensing request is transmitted by the first wireless node to the second wireless node and the response to the bistatic sensing request is received at the first wireless node from the second wireless node.

49. The first wireless node of claim 47, wherein the bistatic sensing request is received at the first wireless node from the second wireless node and the response to the bistatic sensing request is transmitted by the first wireless node to the second wireless node.

50. The first wireless node of claim 47,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations.

51. A second wireless node, comprising:
means for communicating, between the second wireless node and a first wireless node, a bistatic sensing request and a response to the bistatic sensing request to coordinate setup of a bistatic sensing procedure; and
means for measuring a set of reflections of a set of sensing signals transmitted by the first wireless node and reflected off of one or more target objects in accordance with the bistatic sensing procedure, wherein the bistatic sensing procedure is triggered periodically, semi-persistently, or a periodically.

52. The second wireless node of claim 51, wherein the bistatic sensing request is transmitted by the second wireless node to the first wireless node and the response to the bistatic sensing request is received at the second wireless node from the first wireless node.

53. The second wireless node of claim 51, wherein the bistatic sensing request is received at the second wireless node from the first wireless node and the response to the bistatic sensing request is transmitted by the second wireless node to the first wireless node.

54. The second wireless node of claim 51,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

55. A non-transitory computer-readable medium storing a set of instructions, the set of instructions comprising one or more instructions that, when executed by one or more processors of a first wireless node, cause the first wireless node to:
communicate, between the first wireless node and a second wireless node, a bistatic sensing request and a response to the bistatic sensing request to coordinate setup of a bistatic sensing procedure; and
transmit a set of sensing signals to one or more target objects in accordance with the bistatic sensing procedure, wherein the bistatic sensing procedure is triggered periodically, semi-persistently, or a periodically.

56. The non-transitory computer-readable medium of claim 55, wherein the bistatic sensing request is transmitted by the first wireless node to the second wireless node and the response to the bistatic sensing request is received at the first wireless node from the second wireless node.

57. The non-transitory computer-readable medium of claim 55, wherein the bistatic sensing request is received at the first wireless node from the second wireless node and the response to the bistatic sensing request is transmitted by the first wireless node to the second wireless node.

58. The non-transitory computer-readable medium of claim 55,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations.

59. A non-transitory computer-readable medium storing a set of instructions, the set of instructions comprising one or more instructions that, when executed by one or more processors of a second wireless node, cause the second wireless node to:
communicate, between the second wireless node and a first wireless node, a bistatic sensing request and a response to the bistatic sensing request to coordinate setup of a bistatic sensing procedure; and
measure a set of reflections of a set of sensing signals transmitted by the first wireless node and reflected off of one or more target objects in accordance with the bistatic sensing procedure, wherein the bistatic sensing procedure is triggered periodically, semi-persistently, or a periodically.

60. The non-transitory computer-readable medium of claim 59, wherein the bistatic sensing request is transmitted by the second wireless node to the first wireless node and the response to the bistatic sensing request is received at the second wireless node from the first wireless node.

61. The non-transitory computer-readable medium of claim 59, wherein the bistatic sensing request is received at the second wireless node from the first wireless node and the response to the bistatic sensing request is transmitted by the second wireless node to the first wireless node.

62. The non-transitory computer-readable medium of claim 59,
wherein the first wireless node corresponds to a user equipment (UE) and the second wireless node corresponds to a base station, or
wherein the second wireless node corresponds to a UE and the first wireless node corresponds to a base station, or
wherein the first and second wireless nodes correspond to base stations, or
wherein the first and second wireless nodes correspond to UEs.

* * * * *